US012581450B2

(12) United States Patent
Liu et al.

(10) Patent No.: US 12,581,450 B2
(45) Date of Patent: Mar. 17, 2026

(54) WIRELESS COMMUNICATIONS METHOD AND RELATED DEVICE

(71) Applicant: Huawei Technologies Co., Ltd., Shenzhen (CN)

(72) Inventors: Hang Liu, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 621 days.

(21) Appl. No.: 18/074,011

(22) Filed: Dec. 2, 2022

(65) Prior Publication Data

US 2023/0087035 A1 Mar. 23, 2023

Related U.S. Application Data

(63) Continuation of application No. PCT/CN2020/094458, filed on Jun. 4, 2020.

(51) Int. Cl.
*H04W 64/00* (2009.01)

(52) U.S. Cl.
CPC ................................. *H04W 64/00* (2013.01)

(58) Field of Classification Search
CPC . H04W 72/0446; H04W 24/02; H04W 72/04; H04W 88/02; H04W 76/15; H04W 92/18; H04W 72/12; H04W 8/24; H04W 4/029; H04W 4/50; H04W 28/16; H04W 4/025
See application file for complete search history.

(56) References Cited

U.S. PATENT DOCUMENTS

| | | | | |
|---|---|---|---|---|
| 10,002,491 | B2 * | 6/2018 | Greenberg | .......... G07F 17/3227 |
| 11,074,157 | B2 | 7/2021 | Meng et al. | |
| 2012/0015657 | A1 * | 1/2012 | Comsa | .................. H04L 5/0048 |
| | | | | 455/456.6 |
| 2014/0031003 | A1 * | 1/2014 | Shugart | ................. H04W 76/50 |
| | | | | 455/404.2 |
| 2014/0155106 | A1 * | 6/2014 | Bombolowsky | ...... H04W 4/029 |
| | | | | 455/456.6 |

FOREIGN PATENT DOCUMENTS

| | | | |
|---|---|---|---|
| CN | 108882268 A | 11/2018 | |
| CN | 110413248 A | * 11/2019 | .......... G06F 3/1454 |
| CN | 110545533 A | 12/2019 | |
| KR | 20190103628 A | 9/2019 | |

\* cited by examiner

*Primary Examiner* — Khalid W Shaheed
(74) *Attorney, Agent, or Firm* — Conley Rose, P.C.

(57) ABSTRACT

A wireless communications method is applicable to short-range communications, for example, cockpit domain communications, self-driving, or intelligent driving and includes a terminal device that receives first feature information and first configuration information from a network device, where the first feature information indicates a first feature, and the first configuration information is for configuring at least one communications parameter or a device state for at least one terminal device that matches the first feature indicated by the first feature information. Then, when the terminal device determines that a feature of the terminal device matches the first feature, the terminal device is configured based on the first configuration information.

20 Claims, 6 Drawing Sheets

700

800

WIRELESS COMMUNICATIONS METHOD AND RELATED DEVICE

CROSS-REFERENCE TO RELATED APPLICATIONS

This application is a continuation application of International Patent Application No. PCT/CN2020/094458 filed on Jun. 4, 2020, the disclosure of which is hereby incorporated by reference in its entirety.

TECHNICAL FIELD

This application relates to a wireless communications method and a related device, applied to the communications field, for example, short-range communications fields including cockpit domain communications.

BACKGROUND

In short-range communications fields, terminal devices may communicate with each other in a wired or wireless communications manner.

For example, with increasing popularity of vehicles, driving vehicles brings convenience to people in travelling. The application of an intelligent cockpit technology to vehicles makes them not only transportation tools, but also one of living spaces for people. People expect richer entertainment, audio, video, and office experience from the intelligent cockpit.

In the existing intelligent cockpit technology, a vehicle may include a network device and a terminal device, which communicate with each other in a wired manner. The terminal device may be an in-vehicle device mounted in a vehicle or a cockpit, for example, an in-vehicle speaker, an in-vehicle microphone, or an in-vehicle screen. For example, a cockpit domain controller (CDC) is used as a network device, and the CDC communicates with the in-vehicle device in a wired communications manner. In this way, the devices in the cockpit can be intelligently controlled.

However, in the conventional technology similar to the foregoing intelligent cockpit technology or related to short-range communications, wired communications between a network device and a terminal device is possibly restricted by cable costs and in-vehicle cabling factors, and there may be problems such as cabling complexity and difficulty. This causes a cable maintenance challenge and affects system reliability.

SUMMARY

Embodiments of this application provide a wireless communications method and a related device, to implement wireless communications between a network device and a terminal device in a vehicle, thereby avoiding problems such as cabling complexity and difficulty in wired communications, and improving system reliability and maintainability.

A first aspect of embodiments of this application provides a wireless communications method, and the method is applied to a terminal device. In the method, the terminal device receives first feature information and first configuration information from a network device, where the first feature information is used to indicate a first feature, and the first configuration information is used to configure at least one communications parameter and/or a device state for at least one terminal device that matches the first feature indicated by the first feature information. Then, when the terminal device determines that a feature of the terminal device matches the first feature, the terminal device is configured based on the first configuration information. The terminal device may be a terminal device in a vehicle, and the terminal device may include at least one feature. In a wireless communications process between the network device and the terminal device, after the terminal device receives the first feature information and the first configuration information from the network device, when the at least one feature of the terminal device matches the first feature, the terminal device is configured based on the first configuration information, so that wireless communications between the network device and the terminal device in the vehicle can be implemented based on the first feature information and the first configuration information, thereby avoiding problems such as cabling complexity and difficulty in wired communications, and improving system reliability and maintainability.

In a possible implementation of the first aspect of embodiments of this application, the first feature information includes first location information, and the first location information is used to indicate at least one location. A process of determining that a feature of the terminal device matches the first feature may include the following steps. That location information of the terminal device is the first location information is determined. Alternatively, that a location indicated by location information of the terminal device is the same as a location indicated by the first location information is determined. Alternatively, that a location indicated by location information of the terminal device belongs to an area indicated by the first location information is determined. Alternatively, that the terminal device is located in an area indicated by the first location information (the first location information indicates a range) is determined. Alternatively, that location information of the terminal device belongs to the first location information (a location of the terminal device is one of a plurality of locations indicated by the first location information) is determined.

In this embodiment, the first feature information may include the first location information, and the terminal device may determine, based on the location information of the terminal device and at least one of the plurality of implementations of the first location information, that the feature of the terminal device matches the first feature. The first feature information received by the terminal device from the network device may include the first location information. In this case, the first configuration information may be used to configure at least one communications parameter and/or a device state for the at least one terminal device that matches the first location, so that the network device can configure the terminal device based on the location information in a targeted manner.

In a possible implementation of the first aspect of embodiments of this application, the location information of the terminal device is preconfigured or predefined.

In this embodiment, the terminal device may determine the location information of the terminal device in a plurality of implementations. The location information of the terminal device may be preconfigured by the network device for the terminal device, or may be preconfigured or predefined when the terminal device is delivered from a factory. An implementation of the location information of the terminal device is provided, to improve feasibility of the solution, thereby improving implementation flexibility of the solution.

In a possible implementation of the first aspect of embodiments of this application, the location information of the terminal device and/or the first location information are/is location information in a cockpit.

In another possible implementation of the first aspect of embodiments of this application, the location information of the terminal device and/or the first location information are/is location information in a vehicle.

In another possible implementation of the first aspect of embodiments of this application, the location information of the terminal device and/or the first location information are/is relative location information relative to a first coordinate system in a vehicle.

In this embodiment, the location information of the terminal device and/or the first location information may be location information in a cockpit, location information in a vehicle, or relative location information relative to a first coordinate system in a vehicle. The terminal device may be a terminal device in a vehicle, for example, a cockpit device. Because in a running process of the vehicle, an absolute location of the terminal device may change, the location information of the terminal device and/or the first location information may be represented by using a relative location including the location information in a cockpit, the location information in a vehicle, or the relative location information relative to the first coordinate system in the vehicle, to accurately configure the terminal device based on a relative location of the terminal device.

In a possible implementation of the first aspect of embodiments of this application, the first feature information includes first type information, and the first type information is used to indicate at least one device type. A process of determining that the feature of the terminal device matches the first feature may include the following step. That type information of the terminal device is the first type information is determined. Alternatively, that a type of the terminal device belongs to the at least one device type indicated by the first type information.

In this embodiment, the first feature information may include the first type information, and the terminal device may determine that the feature of the terminal device matches the first feature based on the type of the terminal device and a plurality of implementations of the first type information. The first feature information received by the terminal device from the network device may include the first type information, and the first type information is used to indicate at least one device type. In this case, the first configuration information may be used to configure at least one communications parameter and/or a device state for at least one terminal device that matches the first type, so that the network device can configure the terminal device based on the type information in a targeted manner.

In a possible implementation of the first aspect of embodiments of this application, the first feature information includes first priority information, and the first priority information is used to indicate at least one device priority. A process of determining that the feature of the terminal device matches the first feature may include the following step. That priority information of the terminal device is the first priority information is determined. Alternatively, that a priority of the terminal device belongs to the at least one device priority indicated by the first priority information.

In this embodiment, the first feature information may include the first priority information, and the terminal device may determine that the feature of the terminal device matches the first feature based on the priority of the terminal device and a plurality of implementations of the first priority information. The first feature information received by the terminal device from the network device may include the first priority information, and the first priority information is used to indicate at least one device priority. In this case, the first configuration information may be used to configure at least one communications parameter and/or a device state for at least one terminal device that matches the first priority, so that the network device can configure the terminal device based on the priority information in a targeted manner.

In a possible implementation of the first aspect of embodiments of this application, the first feature information may include one or more of the first location information, the first type information, and the first priority information. The first location information may be used to indicate at least one location, the first type information may be used to indicate at least one device type, and the first priority information may be used to indicate at least one device priority. The process of determining that the feature of the terminal device matches the first feature may include the following step. That the feature of the terminal device matches the feature indicated by the one or more pieces of feature information is determined.

In this embodiment, the first feature information may include one or more pieces of feature information of the first location information, the first type information, and the first priority information. In this case, the first configuration information may be used to configure at least one communications parameter and/or a device state for at least one terminal device that matches the feature indicated by the one or more pieces of feature information, so that the network device can configure the terminal device based on the priority information in a targeted manner.

In a possible implementation of the first aspect of embodiments of this application, the at least one communications parameter includes transmit power, and/or the device state includes an active state or a standby state.

In this embodiment, the at least one communications parameter includes transmit power, that is, the terminal device may configure transmit power of the terminal device based on the first configuration information, and/or the device state includes an active state or a standby state, that is, the terminal device may configure, based on the device state, the terminal device to enter the active state or configure the terminal device to enter the standby state. An implementation of the at least one communications parameter and/or the device state is provided, to improve feasibility of the solution, thereby improving implementation flexibility of this solution.

In a possible implementation of the first aspect of embodiments of this application, a process in which the terminal device configures the terminal device based on the first configuration information may include the following step. The terminal device configures the at least one communications parameter and/or the device state of the terminal device based on the first configuration information.

In this embodiment, the first configuration information is used to configure the at least one communications parameter and/or the device state for the at least one terminal device that matches the first feature. The terminal device may configure the at least one communications parameter and/or the device state of the terminal device based on the first configuration information. In an example, the network device may configure the at least one communications parameter and/or the device state of the terminal device by using the first configuration information, to configure the terminal device by using wireless communications between the network device and the terminal device.

A second aspect of embodiments of this application provides a wireless communications method, and the method is applied to a network device. In the method, the network device determines first feature information and first configuration information, where the first feature information is used to indicate a first feature, and the first configuration information is used to configure at least one communications parameter and/or a device state for at least one terminal device that matches the first feature indicated by the first feature information. Then, the network device sends the first feature information and the first configuration information to the terminal device. The terminal device may be a terminal device in a vehicle, and the terminal device may include at least one feature. In a wireless communications process between the network device and the terminal device, the network device determines the first feature information and the first configuration information, and then the network device sends the first feature information and the first configuration information to the terminal device. When at least one feature of the terminal device matches the first feature, the terminal device is configured based on the first configuration information, so that wireless communications between the network device and the terminal device in the vehicle can be implemented based on the first feature information and the first configuration information. This avoids problems such as cabling complexity and difficulty in wired communications, and improves system reliability and maintainability.

In a possible implementation of the second aspect of embodiments of this application, the first feature information includes first location information, and the first configuration information is used to configure at least one communications parameter and/or a device state for at least one terminal device located at the first location information. Alternatively, the first configuration information is used to configure at least one communications parameter and/or a device state for at least one terminal device located at a location indicated by the first location information. Alternatively, the first configuration information is used to configure at least one communications parameter and/or a device state for at least one terminal device that belongs to an area indicated by the first location information. Alternatively, the first configuration information is used to configure at least one communications parameter and/or a device state for at least one terminal device located in an area indicated by the first location information. Alternatively, the first configuration information is used to configure at least one communications parameter and/or a device state for at least one terminal device whose location information belongs to the first location information.

In this embodiment, the first feature information may include the first location information. In this case, the first configuration information may be used to configure at least one communications parameter and/or a device state for at least one terminal device that matches the first location, and the first configuration information may indicate, in a plurality of manners, that the feature of the terminal device matches the first feature. In this way, the network device may configure the terminal device based on the location information in a targeted manner.

In a possible implementation of the second aspect of embodiments of this application, the first location information is location information in a cockpit.

In another possible implementation of the second aspect of embodiments of this application, the location information of the terminal device and/or the first location information are/is location information in a vehicle.

In another possible implementation of the second aspect of embodiments of this application, the location information of the terminal device and/or the first location information are/is relative location information relative to a first coordinate system in a vehicle.

In this embodiment, the first location information may be location information in a cockpit, location information in a vehicle, or relative location information relative to the first coordinate system in a vehicle. The terminal device may be a terminal device in the vehicle, for example, a cockpit device. Because in a running process of the vehicle, an absolute location of the terminal device may change, the first location information may be represented by using the location information in a cockpit, the location information in a vehicle, or the relative location information relative to the first coordinate system on the vehicle, to accurately configure the terminal device based on a relative location of the terminal device.

In a possible implementation of the second aspect of embodiments of this application, the first feature information includes first type information, and the first type information is used to indicate at least one device type. The first configuration information is used to configure at least one communications parameter and/or a device state for at least one terminal device whose type information is the first type information. Alternatively, the first configuration information is used to configure at least one communications parameter and/or a device state for at least one terminal device that belongs to the at least one device type indicated by the first type information.

In this embodiment, the first feature information may include the first type information, and the first configuration information may indicate, in a plurality of manners, that the feature of the terminal device matches the first feature. In this way, the network device may configure the terminal device based on the device type information in a targeted manner.

In a possible implementation of the second aspect of embodiments of this application, the first feature information includes first priority information, and the first priority information is used to indicate at least one device priority. The first configuration information is used to configure at least one communications parameter and/or a device state for at least one terminal device whose priority information is the first type information. Alternatively, the first configuration information is used to configure at least one communications parameter and/or a device state for at least one terminal device that belongs to the at least one device priority indicated by the first priority information.

In this embodiment, the first feature information may include the first priority information, and the first configuration information may indicate, in a plurality of manners, that the feature of the terminal device matches the first feature, so that the network device can configure the terminal device based on the device priority information in a targeted manner.

In a possible implementation of the second aspect of embodiments of this application, the at least one communications parameter includes transmit power, and/or the device state includes an active state or a standby state.

In this embodiment, the at least one communications parameter includes transmit power, that is, the terminal device may configure transmit power of the terminal device based on the first configuration information, and/or the device state includes an active state or a standby state, that is, the terminal device may configure, based on the device state, the terminal device to enter the active state or configure the terminal device to enter the standby state. An implementation of configuring the terminal device by the network device by using the at least one communications parameter and/or the device state is provided, to improve feasibility of the solution, thereby improving implementation flexibility of this solution.

A third aspect of embodiments of this application provides a wireless communication method, and the method is applied to a terminal device. In this method, the terminal device receives first information sent by a network device in a multicast manner. In addition, the terminal device receives resource configuration information from the network device, where the resource configuration information is used to configure a feedback resource set. Then, the terminal device may determine a first feedback resource based on the resource configuration information, where the feedback resource set includes the first feedback resource. Further, the terminal device sends feedback information for the first information to the network device on the first feedback resource. The resource configuration information is used to configure the feedback resource set, and the feedback resource set includes the first feedback resource. In a wireless communications process between the network device and the terminal device, the terminal device may determine the first feedback resource based on the resource configuration information from the network device, and the terminal device may send the feedback information for the first information to the network device on the first feedback resource. A first message is sent by the network device in a multicast manner. In an example, the terminal device sends, on the first feedback resource, a feedback message for the first information sent in a multicast manner, to implement wireless communications between the network device and the terminal device in the vehicle. This avoids problems such as cabling complexity and difficulty in wired communications, improves data transmission security of multicast information in a wireless communications process, and improves system reliability and maintainability.

It should be noted that, in an implementation process of the third aspect of embodiments of this application, in a process in which the network device sends the first information to the terminal device in a multicast manner, the multicast manner may be implemented by sending the first information by using a specified multicast channel (MCH) or a broadcast channel (BCH). Alternatively, the network device may scramble the sent first information by using a specified multicast identifier. Alternatively, the first information may carry a specified multicast address. Alternatively, another multicast manner may be used. This is not limited herein.

In a possible implementation of the third aspect of embodiments of this application, the first information includes data and/or control signaling.

In this embodiment, in the first information that is sent by the network device in a multicast manner and that is received by the terminal device, the first information may include the data and/or the control signaling. In a process of wireless communications between the network device and the terminal device, the network device may send the data in a multicast manner, and/or the network device may send the control signaling in a multicast manner, so that the network device may implement group control (or batch configuration) on the terminal device based on the control signaling sent in a multicast manner, for example, group configuration, group activation, and group sleep. Therefore, the network device may implement wireless communications between the network device and the terminal device in a multicast manner, thereby improving communications efficiency.

In a possible implementation of the third aspect of embodiments of this application, the feedback resource set includes a feedback resource used by at least one terminal device for the first information, and the at least one terminal device belongs to a same multicast group.

In this embodiment, the terminal device receives the resource configuration information from the network device to configure the feedback resource set. The feedback resource set includes feedback resources used by terminal devices in a same multicast group for the first information. In other words, the network device may configure a same feedback resource set for terminal devices in a same multicast group, so that the network device may implement wireless communications between the network device and the terminal device by using the group configuration of the feedback resource, thereby improving communications efficiency.

In a possible implementation of the third aspect of embodiments of this application, the feedback resource set further includes a second feedback resource. The at least one terminal device includes a second terminal device, and in this case, the first feedback resource is orthogonal to the second feedback resource used for the second terminal device. Alternatively, the first feedback resource partially or completely overlaps with the second feedback resource used for the second terminal device.

In this embodiment, the feedback resource set is used for feedback resources of terminal devices in a same multicast group for the first information. Further, the feedback resource set includes the first feedback resource and the second feedback resource. The first feedback resource and the second feedback resource may be used for different terminal devices (that is, the terminal device and the second terminal device) in a same multicast group, and the first feedback resource used for the terminal device and the second feedback resource used for the second terminal device may be orthogonal. Alternatively, the first feedback resource and the second feedback resource do not overlap in the time domain and the frequency domain, that is, do not interfere with each other. Alternatively, the first feedback resource used for the terminal device partially or completely overlaps the second feedback resource used for the second terminal device. In other words, terminal devices in a same multicast group may determine, in the feedback resource set by using the resource configuration information sent by the network device, feedback resources that are mutually orthogonal, partially overlapped, or completely overlapped. In this way, a plurality of implementations in which the network device configures the feedback resource are provided, feasibility of the solution is improved, and implementation flexibility of this solution is improved.

In a possible implementation of the third aspect of embodiments of this application, the process of determining the first feedback resource based on the resource configuration information may include the following. The first feedback resource is determined based on a first parameter of the terminal device and the resource configuration information.

In this embodiment, at least one parameter may be preconfigured in the terminal device. The at least one parameter includes the first parameter, and the terminal device may determine the first feedback resource in the feedback resource set based on the first parameter, thereby providing an implementation of determining the first feedback resource by the terminal device. This improves flexibility of feedback resource configuration.

In a possible implementation of the third aspect of embodiments of this application, the resource configuration information includes a first feedback identifier and first resource configuration information used to configure the first feedback resource. The first feedback resource is used by at least one terminal device whose feedback identifier is the first feedback identifier. In this case, the process of determining the first feedback resource based on the resource configuration information may include the following step. When the feedback identifier of the terminal device is the first feedback identifier, the first feedback resource is determined based on the first resource configuration information.

In this embodiment, the feedback resource set may include the first resource configuration information used to configure the first feedback resource. Further, the resource configuration information includes the first feedback identifier and the first resource configuration information used to configure the first feedback resource. The first feedback resource is used by at least one terminal device whose feedback identifier is the first feedback identifier. At least one feedback identifier may be preconfigured in the terminal device. When one of the at least one feedback identifier in the terminal device is the first feedback identifier, the terminal device determines the first feedback resource based on the first resource configuration information, to provide an implementation in which the terminal device determines the first feedback resource, thereby improving feedback resource configuration efficiency.

In a possible implementation of the third aspect of embodiments of this application, the first parameter is preconfigured or predefined.

In this embodiment, the first parameter may be preconfigured in the terminal device. Further, the first parameter may be configured by the network device for the terminal device, or may be preconfigured or predefined when the terminal device is delivered from a factory. Therefore, an implementation in which the terminal device determines the first parameter is provided, thereby improving feasibility of the solution, and improving implementation flexibility of this solution.

In a possible implementation of the third aspect of embodiments of this application, the first information may include first feature information and first configuration information. The first configuration information is used to configure at least one communications parameter and/or a device state for at least one terminal device that matches a first feature indicated by the first feature information.

In this embodiment, the first information that is sent by the network device in a multicast manner and that is received by the terminal device includes the first feature information and the first configuration information. The terminal device includes at least one feature, and when at least one feature in the terminal device matches the first feature, the terminal device may configure the at least one communications parameter and/or the device state of the terminal device by using the first information, so that the terminal device can implement group configuration of a multicast group to which the terminal device belongs based on the first information sent in a multicast manner, thereby improving communications efficiency.

A fourth aspect of embodiments of this application provides a wireless communications method, and the method is applied to a network device. In the method, the network device sends first information to at least one terminal device in a multicast manner. In addition, the network device sends resource configuration information to the terminal device, where the resource configuration information is used to configure a feedback resource set, and the feedback resource set includes a first feedback resource. Then, the network device receives, on the first feedback resource, feedback information that is for the first information and that is from the terminal device. In a wireless communications process between the network device and the terminal device, the network device may send the resource configuration information to the terminal device, so that the terminal device can determine the first feedback resource based on the resource configuration information from the network device. Then, the network device may receive, on the first feedback resource, the feedback information sent by the terminal device for the first information. A first message is sent by the network device in a multicast manner, that is, the network device receives, on the first feedback resource, a feedback message for the first information sent in a multicast manner. In this way, wireless communications between the network device and the terminal device in a vehicle is implemented, so that problems such as cabling complexity and difficulty in wired communications are avoided, data transmission security of multicast information in the wireless communications process is improved, and system reliability and maintainability are improved.

It should be noted that, in an implementation process of the fourth aspect of embodiments of this application, in a process in which the network device sends the first information to the terminal device in a multicast manner, the multicast manner may be implemented by sending the first information by using a specified MCH or a BCH. Alternatively, the network device may scramble the sent first information by using a specified multicast identifier. Alternatively, the first information may carry a specified multicast address. Alternatively, another multicast manner may be used. This is not limited herein.

In a possible implementation of the fourth aspect of embodiments of this application, the first information includes data and/or control signaling.

In this embodiment, in the first information sent by the network device in a multicast manner, the first information may include the data and/or the control signaling. In a process of wireless communications between the network device and the terminal device, the network device may send the data in a multicast manner, and/or the network device may send the control signaling in a multicast manner, so that the network device may implement group control (or batch configuration) on the terminal device based on the control signaling sent in a multicast manner, for example, group configuration, group activation, and group sleep. Therefore, the network device may implement wireless communications between the network device and the terminal device in a multicast manner, thereby improving communications efficiency.

In a possible implementation of the fourth aspect of embodiments of this application, the feedback resource set includes a feedback resource used by at least one terminal device for the first information, and the at least one terminal device belongs to a same multicast group.

In this embodiment, the resource configuration information sent by the network device to the terminal device is used to configure the feedback resource set. The feedback resource set includes feedback resources used by terminal devices in a same multicast group for the first information. In other words, the network device may configure a same feedback resource set for the terminal devices in the same multicast group, so that the network device may implement wireless communications between the network device and the terminal device by using the group configuration of the feedback resource, thereby improving communications efficiency.

In a possible implementation of the fourth aspect of embodiments of this application, the feedback resource set further includes a second feedback resource. The at least one terminal device includes a second terminal device, and in this case, the first feedback resource is orthogonal to the second feedback resource used for the second terminal device. Alternatively, the first feedback resource partially or completely overlaps with the second feedback resource used for the second terminal device.

In this embodiment, the feedback resource set is used for feedback resources of terminal devices in a same multicast group for the first information. Further, the feedback resource set includes the first feedback resource and the second feedback resource. The first feedback resource and the second feedback resource may be used for different terminal devices (that is, the terminal device and the second terminal device) in a same multicast group, and the first feedback resource used for the terminal device and the second feedback resource used for the second terminal device may be orthogonal. Alternatively, the first feedback resource and the second feedback resource do not overlap in the time domain and the frequency domain, that is, do not interfere with each other. Alternatively, the first feedback resource used for the terminal device partially or completely overlaps the second feedback resource used for the second terminal device. In other words, terminal devices in a same multicast group may determine, in the feedback resource set by using the resource configuration information sent by the network device, feedback resources that are mutually orthogonal, partially overlapped, or completely overlapped. In this way, a plurality of implementations in which the network device configures the feedback resource are provided, and flexibility of feedback resource configuration is improved.

In a possible implementation of the fourth aspect of embodiments of this application, the resource configuration information includes a first feedback identifier and first resource configuration information used to configure the first feedback resource, and the first feedback resource is used by at least one terminal device whose feedback identifier is the first feedback identifier.

In this embodiment, the feedback resource set may include the first resource configuration information used to configure the first feedback resource. Further, the resource configuration information includes the first feedback identifier and the first resource configuration information used to configure the first feedback resource. The first feedback resource is used by at least one terminal device whose feedback identifier is the first feedback identifier. Further, at least one identifier may be preconfigured in the terminal device. When a feedback identifier in the at least one identifier in the terminal device is the first feedback identifier, the terminal device determines the first feedback resource based on the first resource configuration information, to provide an implementation of configuring the resource configuration information by the network device, thereby improving flexibility of feedback resource configuration.

In a possible implementation of the fourth aspect of embodiments of this application, the first information may include first feature information and first configuration information. The first configuration information is used to configure at least one communications parameter and/or a device state for at least one terminal device that matches a first feature indicated by the first feature information.

In this embodiment, the first information sent by the network device in a multicast manner includes the first feature information and the first configuration information. The terminal device includes at least one feature, and when at least one feature in the terminal device matches the first feature, the terminal device may configure the at least one communications parameter and/or the device state of the terminal device by using the first information, so that the network device can implement group configuration of a multicast group to which the terminal device belongs based on the first information sent in a multicast manner, thereby improving communications efficiency.

A fifth aspect of embodiments of this application provides a communications apparatus, and the communications apparatus includes a transceiver unit and a processing unit. The transceiver unit is configured to receive first feature information and first configuration information from a network device, where the first configuration information is used to configure at least one communications parameter and/or a device state for at least one terminal device that matches a first feature indicated by the first feature information. The processing unit is configured to determine that a feature of the terminal device matches the first feature. The processing unit is further configured to configure the terminal device based on the first configuration information. The terminal device may be a terminal device in a vehicle, and the terminal device may include at least one feature. In a wireless communications process between the network device and the terminal device, after the transceiver unit receives the first feature information and the first configuration information from the network device, when the at least one feature of the terminal device matches the first feature, the processing unit configures the terminal device based on the first configuration information, so that the processing unit can implement wireless communications between the network device and the terminal device in the vehicle based on the first feature information and the first configuration information, thereby avoiding problems such as cabling complexity and difficulty in wired communications, and improving system reliability and maintainability.

In a possible implementation of the fifth aspect of embodiments of this application, the first feature information includes first location information.

The processing unit is configured to determine that location information of the terminal device is the first location information, or determine that a location indicated by location information of the terminal device is the same as a location indicated by the first location information, or determine that a location indicated by location information of the terminal device belongs to an area indicated by the first location information, or determine that the terminal device is located in an area indicated by the first location information, or determine that location information of the terminal device belongs to the first location information.

In a possible implementation of the fifth aspect of embodiments of this application, the location information of the terminal device is preconfigured or predefined.

In a possible implementation of the fifth aspect of embodiments of this application, the location information of the terminal device and/or the first location information are/is location information in a cockpit.

In a possible implementation of the fifth aspect of embodiments of this application, the first feature information includes first type information, and the first type information is used to indicate at least one device type.

The processing unit is configured to determine that type information of the terminal device is the first type information, or determine that a type of the terminal device belongs to the at least one device type indicated by the first type information.

In a possible implementation of the fifth aspect of embodiments of this application, the first feature information includes first priority information, and the first priority information is used to indicate at least one device priority.

The processing unit is configured to determine that priority information of the terminal device is the first priority information, or determine that a priority of the terminal device belongs to the at least one device priority indicated by the first priority information.

In a possible implementation of the fifth aspect of embodiments of this application, the at least one communications parameter includes transmit power, and/or the device state includes an active state or a standby state.

In a possible implementation of the fifth aspect of embodiments of this application, the processing unit is configured to configure the at least one communications parameter and/or the device state of the terminal device based on the first configuration information.

In the fifth aspect of embodiments of this application, composition modules of the communications apparatus may be further configured to perform the steps performed in the possible implementations of the first aspect. For details, refer to the first aspect. Details are not described herein again.

A sixth aspect of embodiments of this application provides a communications apparatus, and the communications apparatus includes a transceiver unit and a processing unit. The processing unit is configured to determine first feature information and first configuration information, where the first configuration information is used to configure at least one communications parameter and/or a device state for at least one terminal device that matches a first feature indicated by the first feature information. The transceiver unit is configured to send the first feature information and the first configuration information to a terminal device. The terminal device may be a terminal device in a vehicle, and the terminal device may include at least one feature. In a wireless communications process between the network device and the terminal device, the processing unit determines the first feature information and the first configuration information, and then the transceiver unit sends the first feature information and the first configuration information to the terminal device. When at least one feature of the terminal device matches the first feature, the terminal device is configured based on the first configuration information, so that wireless communications between the network device and the terminal device in the vehicle can be implemented based on the first feature information and the first configuration information. This avoids problems such as cabling complexity and difficulty in wired communications, and improves system reliability and maintainability.

In a possible implementation of the sixth aspect of embodiments of this application, the first feature information includes first location information.

The first configuration information is used to configure at least one communications parameter and/or a device state for at least one terminal device located at a location indicated by the first location information, or the first configuration information is used to configure at least one communications parameter and/or a device state for at least one terminal device located in an area indicated by the first location information, or the first configuration information is used to configure at least one communications parameter and/or a device state for at least one terminal device whose location information belongs to the first location information.

In a possible implementation of the sixth aspect of embodiments of this application, the first location information is location information in a cockpit.

In a possible implementation of the sixth aspect of embodiments of this application, the first feature information includes first type information, and the first type information is used to indicate at least one device type.

The first configuration information is used to configure at least one communications parameter and/or a device state for at least one terminal device whose type information is the first type information, or the first configuration information is used to configure at least one communications parameter and/or a device state for at least one terminal device that belongs to the at least one device type indicated by the first type information.

In a possible implementation of the sixth aspect of embodiments of this application, the first feature information includes first priority information, and the first priority information is used to indicate at least one device priority.

The first configuration information is used to configure at least one communications parameter and/or a device state for at least one terminal device whose priority information is the first priority information, or the first configuration information is used to configure at least one communications parameter and/or a device state for at least one terminal device that belongs to the at least one device priority indicated by the first priority information.

In a possible implementation of the sixth aspect of embodiments of this application, the at least one communications parameter includes transmit power, and/or the device state includes an active state or a standby state.

In the sixth aspect of embodiments of this application, composition modules of the network device may be further configured to perform the steps performed in the possible implementations of the second aspect. For details, refer to the second aspect. Details are not described herein again.

A seventh aspect of embodiments of this application provides a communications apparatus. The communications apparatus includes a transceiver unit and a processing unit. The transceiver unit is configured to receive first information sent by a network device in a multicast manner. The transceiver unit is further configured to receive resource configuration information from the network device, where the resource configuration information is used to configure a feedback resource set. The processing unit is configured to determine a first feedback resource based on the resource configuration information, where the feedback resource set includes the first feedback resource. The transceiver unit is further configured to send feedback information for the first information to the network device on the first feedback resource. The resource configuration information is used to configure the feedback resource set, and the feedback resource set includes the first feedback resource. In a wireless communications process between the network device and the terminal device, the processing unit may determine the first feedback resource based on the resource configuration information from the network device, and the transceiver unit may send the feedback information for the first information to the network device on the first feedback resource. The first message is sent by the network device in a multicast manner. In an example, the transceiver unit in the terminal device sends, on the first feedback resource, the feedback message for the first information sent in a multicast manner, to implement wireless communications between the network device and the terminal device in the vehicle. This avoids problems such as cabling complexity and difficulty in wired communications, improves data transmission security in a wireless communications process, and improves system reliability and maintainability.

In a possible implementation of the seventh aspect of embodiments of this application, the first information includes data and/or control signaling.

In a possible implementation of the seventh aspect of embodiments of this application, the feedback resource set includes a feedback resource used by at least one terminal device for the first information, and the at least one terminal device belongs to a same multicast group.

In a possible implementation of the seventh aspect of embodiments of this application, the feedback resource set further includes a second feedback resource, and the at least one terminal device includes a second terminal device.

The first feedback resource is orthogonal to the second feedback resource used for the second terminal device, or the first feedback resource partially or completely overlaps with the second feedback resource used for the second terminal device.

In a possible implementation of the seventh aspect of embodiments of this application, the processing unit is configured to determine the first feedback resource based on a first parameter of the terminal device and the resource configuration information.

In a possible implementation of the seventh aspect of embodiments of this application, the resource configuration information includes a first feedback identifier and first resource configuration information used to configure the first feedback resource, and the first feedback resource is used by at least one terminal device whose feedback identifier is the first feedback identifier.

The processing unit is configured to, when the feedback identifier of the terminal device includes the first feedback identifier, determine the first feedback resource based on the first resource configuration information.

In a possible implementation of the seventh aspect of embodiments of this application, the first parameter is pre-configured or predefined.

In the seventh aspect of embodiments of this application, composition modules of the communications apparatus may be further configured to perform the steps performed in the possible implementations of the third aspect. For details, refer to the third aspect. Details are not described herein again.

An eighth aspect of embodiments of this application provides a communications apparatus, where the communications apparatus includes a sending unit and a receiving unit. The sending unit is configured to send first information in a multicast manner. The sending unit is further configured to send resource configuration information to the terminal device, where the resource configuration information is used to configure a feedback resource set, and the feedback resource set includes a first feedback resource. The receiving unit is configured to receive, on the first feedback resource, feedback information for the first information from the terminal device. In a wireless communications process between a network device and the terminal device, the sending unit may send the resource configuration information to the terminal device, so that the terminal device can determine the first feedback resource based on the resource configuration information from the network device. Then, the receiving unit may receive, on the first feedback resource, the feedback information sent by the terminal device for the first information. A first message is sent by the network device in a multicast manner, that is, the receiving unit in the network device receives, on the first feedback resource, a feedback message for the first information sent in a multicast manner. In this way, wireless communications between the network device and the terminal device in a vehicle is implemented, so that problems such as cabling complexity and difficulty in wired communications are avoided, data transmission security in a wireless communications process is improved, and system reliability and maintainability are improved.

In a possible implementation of the eighth aspect of embodiments of this application, the first information includes data and/or control signaling.

In a possible implementation of the eighth aspect of embodiments of this application, the feedback resource set includes a feedback resource used by at least one terminal device for the first information, and the at least one terminal device belongs to a same multicast group.

In a possible implementation of the eighth aspect of embodiments of this application, the feedback resource set further includes a second feedback resource, and the at least one terminal device includes a second terminal device.

The first feedback resource is orthogonal to the second feedback resource used for the second terminal device, or the first feedback resource partially or completely overlaps with the second feedback resource used for the second terminal device.

In a possible implementation of the eighth aspect of embodiments of this application, the resource configuration information includes a first feedback identifier and first resource configuration information used to configure the first feedback resource, and the first feedback resource is used by at least one terminal device whose feedback identifier is the first feedback identifier.

In the eighth aspect of embodiments of this application, composition modules of the communications apparatus may be further configured to perform the steps performed in the possible implementations of the fourth aspect. For details, refer to the fourth aspect. Details are not described herein again.

A ninth aspect of embodiments of this application provides a communications apparatus, where the communications apparatus includes at least one processor and an interface circuit, and the interface circuit is configured to provide a program or instructions for the at least one processor. The at least one processor is configured to execute the program or the instructions, so that the communications apparatus implements the method according to the first aspect or any one of the possible implementations of the first aspect, or implements the method according to the third aspect or any one of the possible implementations of the third aspect.

A tenth aspect of embodiments of this application provides a communications apparatus, where the communications apparatus includes at least one processor and an interface circuit, and the interface circuit is configured to provide a program or instructions for the at least one processor. The at least one processor is configured to execute the program or the instructions, so that the communications apparatus implements the method according to the second aspect or any one of the possible implementations of the second aspect, or implements the method according to the fourth aspect or any one of the possible implementations of the fourth aspect.

An eleventh aspect of embodiments of this application provides a computer-readable storage medium that stores one or more computer-executable instructions. When the computer-executable instructions are executed by a processor, the processor performs the method in the first aspect or any one of the possible implementations of the first aspect, or the third aspect or any one of the possible implementations of the third aspect.

A twelfth aspect of embodiments of this application provides a computer-readable storage medium that stores one or more computer-executable instructions. When the computer-executable instructions are executed by a processor, the processor performs the method in the second aspect or any one of the possible implementations of the second aspect, or the processor performs the method in the fourth aspect or any one of the possible implementations of the fourth aspect.

A thirteenth aspect of embodiments of this application provides a computer program product (or referred to as a computer program) that stores one or more computers. When the computer program product is executed by a processor, the processor performs the method in the first aspect or any one of the possible implementations of the first aspect, or the third aspect or any one of the possible implementations of the third aspect.

A fourteenth aspect of embodiments of this application provides a computer program product that stores one or more computers. When the computer program product is executed by the processor, the processor performs the method in the second aspect or any one of the possible implementations of the second aspect, or the processor performs the method in the fourth aspect or any one of the possible implementations of the fourth aspect.

A fifteenth aspect of embodiments of this application provides a chip system. The chip system includes at least one processor, configured to support a network device in implementing a function in the first aspect or any one of the possible implementations of the first aspect, or the third aspect or any one of the possible implementations of the third aspect. In a possible design, the chip system may further include a memory. The memory is configured to store program instructions and data that are necessary for the terminal device. The chip system may include a chip, or may include a chip and another discrete component. Optionally, the chip system further includes an interface circuit, and the interface circuit provides program instructions and/or data for the at least one processor.

A sixteenth aspect of embodiments of this application provides a chip system. The chip system includes at least one processor, configured to support a terminal device in implementing a function in the second aspect or any one of the possible implementations of the second aspect, or the fourth aspect or any one of the possible implementations of the fourth aspect. In a possible design, the chip system may further include a memory. The memory is configured to store program instructions and data that are necessary for the network device. The chip system may include a chip, or may include a chip and another discrete component. Optionally, the chip system further includes an interface circuit, and the interface circuit provides program instructions and/or data for the at least one processor.

A seventeenth aspect of embodiments of this application provides a communications system, where the communications system includes the terminal device in the fifth aspect and the network device in the sixth aspect, or the communications system includes the terminal device in the seventh aspect and the network device in the eighth aspect, or the communications system includes the terminal device in the ninth aspect and the network device in the tenth aspect.

For technical effects brought by the fifth aspect, the seventh aspect, the ninth aspect, the eleventh aspect, the thirteenth aspect, the fifteenth aspect, and the seventeenth aspect or any one of the possible implementations thereof, refer to technical effects brought by the first aspect or different possible implementations of the first aspect, or refer to technical effects brought by the third aspect or different possible implementations of the third aspect. Details are not described herein again.

For technical effects brought by the sixth aspect, the eighth aspect, the tenth aspect, the twelfth aspect, the fourteenth aspect, the sixteenth aspect, and the seventeenth aspect or any one of the possible implementations thereof, refer to technical effects brought by the second aspect or different possible implementations of the second aspect, or refer to technical effects brought by the fourth aspect or different possible implementations of the fourth aspect. Details are not described herein again.

It can be seen from the foregoing technical solution, embodiments of this application has the following advantages. A terminal device receives first feature information and first configuration information from a network device, where the first feature information is used to indicate a first feature, and the first configuration information is used to configure at least one communications parameter and/or a device state for at least one terminal device that matches the first feature indicated by the first feature information. Then, when the terminal device determines that a feature of the terminal device matches the first feature, the terminal device is configured based on the first configuration information. The terminal device may be a terminal device in a vehicle, and the terminal device may include at least one feature. In a wireless communications process between the network device and the terminal device, after the terminal device receives the first feature information and the first configuration information from the network device, when the at least one feature of the terminal device matches the first feature, the terminal device is configured based on the first configuration information, so that wireless communications between the network device and the terminal device in the vehicle can be implemented based on the first feature information and the first configuration information, thereby avoiding problems such as cabling complexity and difficulty in wired communications, and improving system reliability and maintainability.

DESCRIPTION OF EMBODIMENTS

Figure 1A:
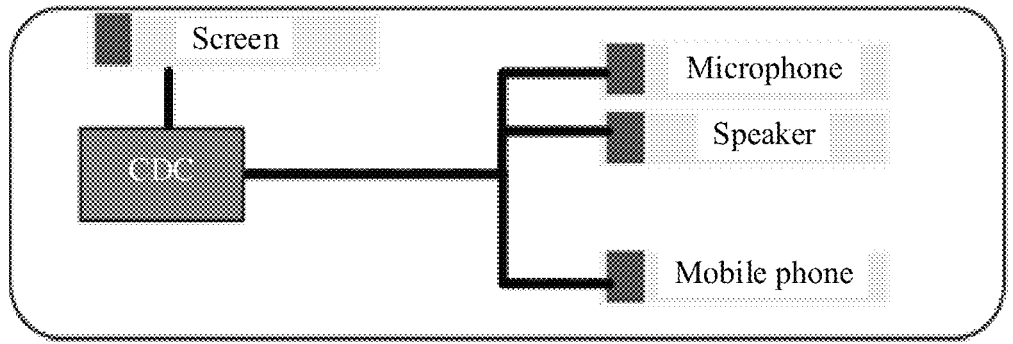
FIG. 1A is a schematic diagram of a system architecture according to an embodiment of this application.

The following describes the technical solutions in embodiments of this application with reference to the accompanying drawings in embodiments of this application. It is clear that the described embodiments are merely a part rather than all of embodiments of this application. All other embodiments obtained by a person of ordinary skill in the art based on embodiments of this application without creative efforts shall fall within the protection scope of this application.

A system architecture in this application may be applied to a transportation means or an intelligent scenario. The transportation means may be implemented in a vehicle or in a form of a vehicle. For example, the transportation means may be implemented on another vehicle or in a form of another vehicle, such as a car, a truck, a motorcycle, a bus, a boat, an aircraft, a helicopter, a lawn mower, a snowmobile, a recess vehicle, an amusement park vehicle, agricultural equipment, construction equipment, a tram, a golf vehicle, a train, a trolley bus, and the like. The intelligent scenario may be a scenario in which an intelligent terminal is located, and the intelligent terminal may be a robot, a smart home device, an intelligent wearable device, or the like.

Generally, a network device and a terminal device included in a transportation means or an intelligent scenario may communicate with each other.

It should be noted that the network device in embodiments of this application may be a CDC, an intelligent device, or the like in a transportation means or an intelligent scenario, and may also be referred to as an access device or a wireless network device. The network device may be an evolved NodeB (eNB or eNodeB) in a Long-Term Evolution (LTE) system, or may be a radio controller in a cloud radio access network (CRAN) scenario. Alternatively, the access device may be a relay station, an access point, an in-vehicle device, a wearable device, an access device in a 5G network, or a network device in a future evolved public land mobile network (PLMN). The access device may be an access point (AP) in a wireless local area network (WLAN), or may be a gNB in a New Radio (NR) system. This is not limited in embodiments of this application.

Optionally, the access device is a device in a radio access network (RAN), or a RAN node through which the terminal to access a wireless network, for example, by way of example but not limitation, as a network device, for example, a gNB, a transmission reception point (TRP), an eNB, a radio network controller (RNC), a node B (NB), or a base station controller (BSC), a base transceiver station (BTS), a home base station (for example, a home evolved NodeB, or a home Node B (HNB)), a base band unit (BBU), a WI-FI AP, or the like. In a network structure, the network device may include a centralized unit (CU) node or a distributed unit (DU) node, a RAN device including a CU node and a DU node, or a RAN device including a CU control plane (CP) node (CU-CP node), a CU user plane (UP) node (CU-UP node), and a DU node.

It should be noted that the terminal (or the terminal device) in embodiments of this application may be a device that provides voice/data connectivity for a user, for example, a handheld device or an in-vehicle device with a wireless connection function. Some examples of the terminal are a mobile phone, a tablet computer, a notebook computer, a palmtop computer, a mobile internet device (MID), a wearable device, a virtual reality (VR) device, an augmented reality (AR) device, a wireless terminal in self driving, a cellular phone, a cordless phone, a Session Initiation Protocol (SIP) phone, a personal digital assistant (PDA), a handheld device with a wireless communications function, a computing device, an in-vehicle device, a wearable device, a terminal device in a fifth generation (5G) network, and a terminal device in a future evolved PLMN. This is not limited in embodiments of this application.

Optionally, the terminal may be in a plurality of forms. This is not limited in embodiments of this application.

In a possible implementation, the terminal may be an independent device.

In another possible implementation, the terminal may be integrated into another device as a function module or a chip apparatus.

It should be further noted that, in a possible embodiment of this application, terminals are classified into a "vehicle-mounted terminal" and a "non-vehicle-mounted terminal" based on a relationship between the terminal and the cockpit.

The "vehicle-mounted terminal", also referred to as an on-board unit (OBU), is a device that is integrated into or installed on a cockpit domain and that belongs to a part of the cockpit domain, for example, a vehicle-mounted speaker, a vehicle-mounted microphone, or a vehicle-mounted display. Generally, the vehicle-mounted terminal may be a device factory-installed in a vehicle by a vehicle manufacturer.

The "non-vehicle-mounted terminal" is a device that is placed in a cockpit domain and that can communicate with or connect to another device in the cockpit domain, but does not belong to a part of the cockpit, for example, an intelligent terminal, a tablet computer, a Bluetooth headset, or a wearable device of a user.

In a possible implementation, the network device in this embodiment of this application may be a CDC, and the at least one terminal may include at least one of a vehicle-mounted terminal or a non-vehicle-mounted terminal.

For example, in the conventional technology, in a system architecture shown in FIG. 1A, a CDC is used as a network device, a microphone, a sound box, and a mobile phone in a cockpit are used as terminal devices, and the CDC communicates with each terminal device (the microphone, the sound box, and the mobile phone) in a wired manner.

Figure 1B:
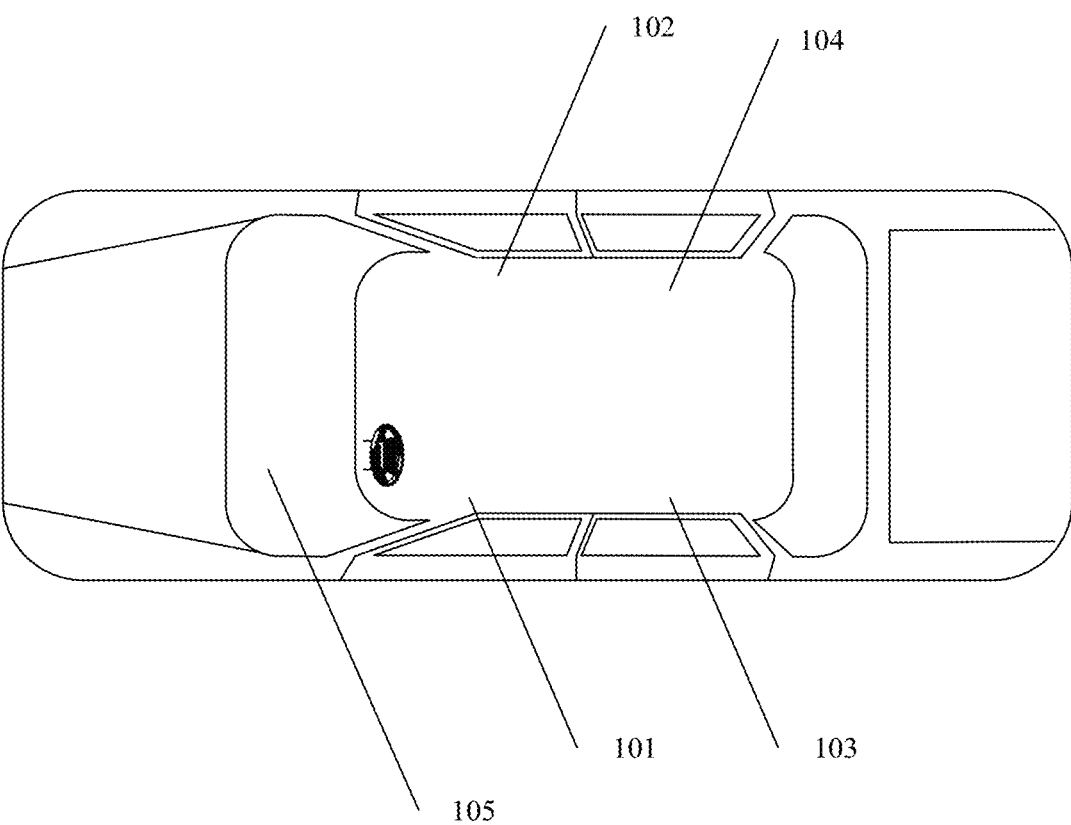
FIG. 1B is another schematic diagram of a system architecture according to an embodiment of this application.

Refer to a system architecture shown in FIG. 1B. When the transportation means is implemented as a vehicle, that is, when the intelligent cockpit technology is applied to the vehicle, different cockpit areas (for example, a cockpit driving position 101, a cockpit front passenger position 102, a rear seat 103 of the cockpit driving position, and a rear seat 104 of the cockpit front passenger position) may include respective corresponding terminal devices, and a network device (for example, a CDC) may be integrated into a vehicle center console 105. The network device communicates with the terminal devices in the cockpit area in a wired manner.

However, in implementation of the foregoing intelligent cockpit technology, wired communications between the network device and the terminal device is possibly restricted by cable costs and in-vehicle cabling factors, and there may be problems such as cabling complexity and difficulty. This causes a cable maintenance challenge, and affects system reliability.

Figures 2, 3:
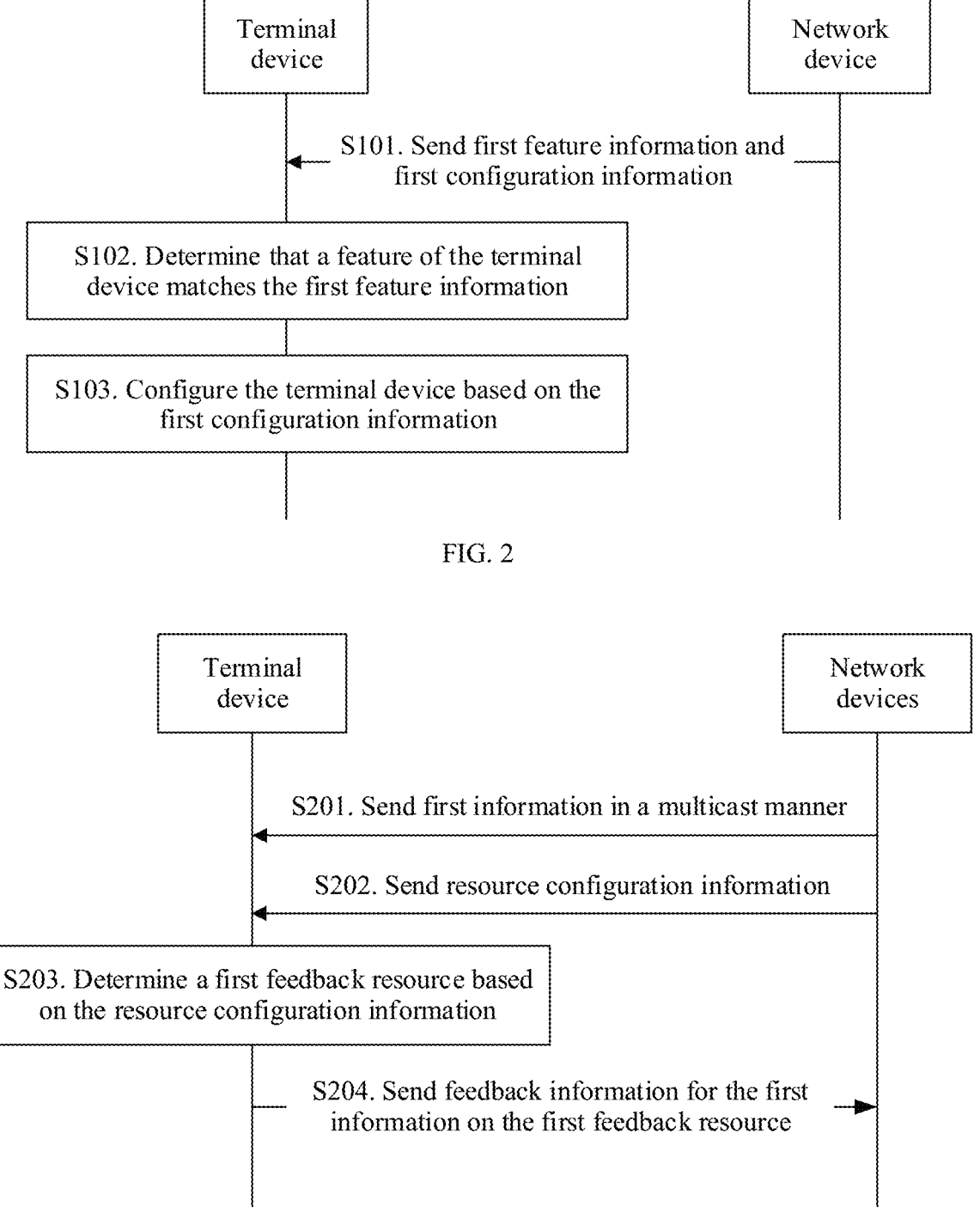
FIG. 2 is a schematic diagram of a wireless communications method according to an embodiment of this application.
FIG. 3 is another schematic diagram of a wireless communications method according to an embodiment of this application.

Therefore, embodiments of this application provide a wireless communications method and a related device, to implement wireless communications between a network device and a terminal device in a vehicle, thereby avoiding problems such as cabling complexity and difficulty in wired communications, and improving system reliability and maintainability. The following uses a case in which embodiments of this application are applied to a vehicle of the transportation means as an example for description. Refer to FIG. 2. An embodiment of this application provides a wireless communications method including the following steps.

S101. A network device sends first feature information and first configuration information to a terminal device.

In this embodiment, the network device sends the first feature information and the first configuration information to the terminal device. Correspondingly, the terminal device receives the first feature information and the first configuration information from the network device in step S101. The first configuration information is used to configure at least one communications parameter and/or a device state for at least one terminal device that matches a first feature indicated by the first feature information.

The network device may be a CDC, an intelligent terminal, or the like. The terminal device may be a vehicle or an in-vehicle device in a vehicle cockpit, for example, an in-vehicle speaker, an in-vehicle microphone, or an in-vehicle screen. Types of the network device and the terminal device are not limited in this embodiment and subsequent embodiments, and it is subject to that wireless communications can be implemented.

Before step S101, the network device may determine or generate the first feature information and the first configuration information. The first feature information is used to indicate the first feature, and the first configuration information is used to configure the at least one communications parameter and/or the device state. Further, the first configuration information is used to configure the at least one communications parameter and/or the device state for the at least one terminal device that matches the first feature indicated by the first feature information. Further, when the network device determines that the at least one communications parameter and/or the device state need/needs to be configured for the terminal device that matches the first feature, the network device may determine or generate the first feature information and the first configuration information, and perform step S101 to send the first feature information and the first configuration information to the terminal device.

In an implementation process of step S101, the network device may carry, by using a same message, the first feature information and the first configuration information that are sent to the terminal device, or may carry, by using different messages, the first feature information and the first configuration information that are sent to the terminal device. This is not limited herein. In addition, an implementation of a message that carries both the first feature information and the first configuration information or messages that separately carry the first feature information and the first configuration information may be implemented by using a unicast message, a multicast message, or a broadcast message sent by the network device to the terminal device. This is not limited herein. If the message carrying the first feature information and the first configuration information is sent to the terminal device in a multicast manner, the multicast manner may be implemented by sending, by using a specified MCH or BCH, the message carrying the first feature information and the first configuration information. Alternatively, the network device may scramble, by using a specified multicast identifier, the sent message carrying the first feature information and the first configuration information. Alternatively, the message carrying the first feature information and the first configuration information may further carry a specified multicast address. Alternatively, another multicast manner may be used. This is not limited herein.

Further, the first feature information may be implemented in a plurality of forms. The network device may configure the terminal device based on a difference of the first feature information in a targeted manner. This is separately described in the following.

1. The first feature information is first location information.

In this case, the first configuration information may be used to configure at least one communications parameter and/or a device state for at least one terminal device that matches the first location. The network device may configure the terminal device based on a difference of location information in a targeted manner. Location information of the terminal may be defined by vehicle factory pre-configuration or pre-stipulation in a protocol. For example, different location information is set based on different locations of the terminal device, and the first location information may indicate a seat position, a door position, a window position, or the like, or another position in a vehicle.

Further, the first location information may be location information in a cockpit. The terminal device may be a terminal device in a vehicle, for example, a cockpit device. Because an absolute location of the terminal device may change in a running process of the vehicle, the first location information may be represented by using location information in the cockpit, so that the terminal device is accurately configured based on a relative location of the location information in the cockpit. For example, the first location information may indicate a location of a cockpit driving position, a location of a cockpit front passenger position, a location of a rear seat of the cockpit driving position, or another location.

It should be noted herein that the cockpit domain in the vehicle is used as an example for description. In this application, the first location information is not limited to location information in the vehicle or the cockpit domain. The vehicle may be replaced with any terminal or device, or the first location information may be relative location information related to a scenario in which the network device and the terminal device are located.

Optionally, the location information of the terminal device and/or the first location information may also be location information in a vehicle or a device. For example, the location information of the terminal device may be used to indicate a location in a vehicle such as an engine compartment or a trunk.

It may be understood that the location information of the terminal device and/or the first location information may be relative location information relative to a first coordinate system of the vehicle or the device.

Figure 1C:
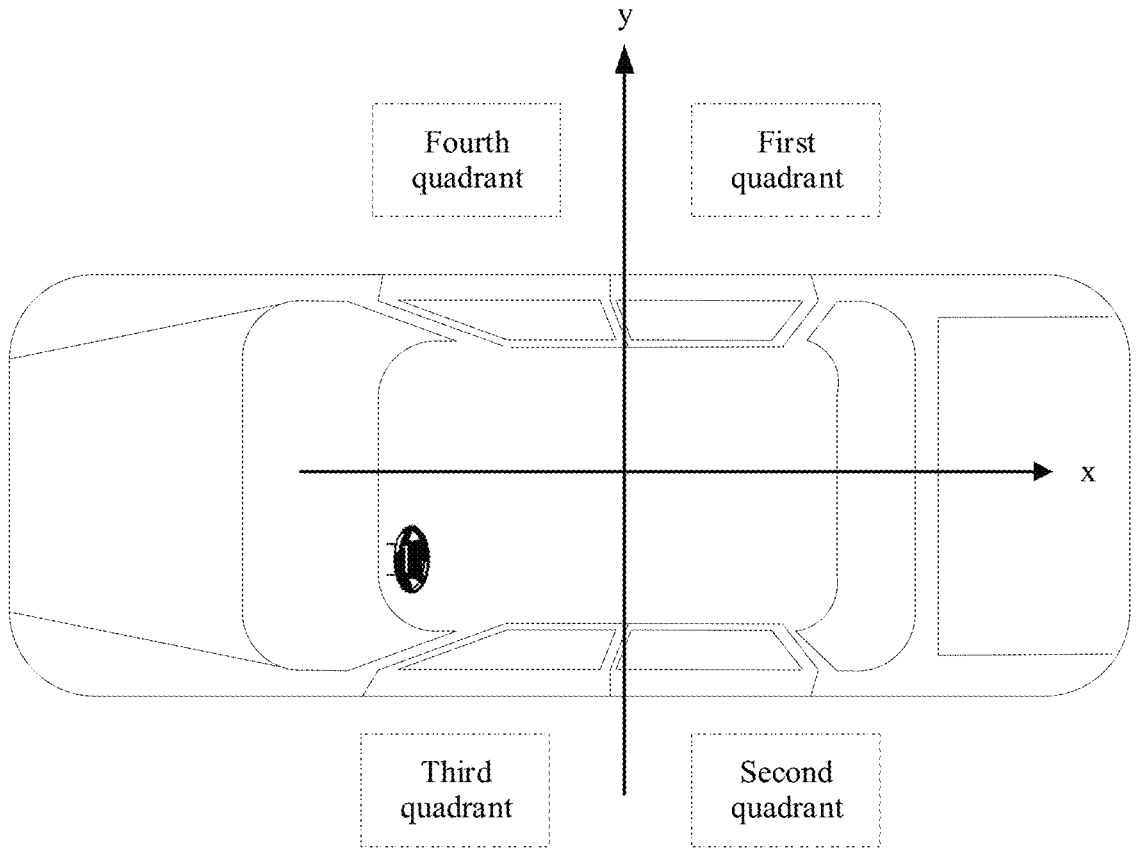
FIG. 1C is still another schematic diagram of a system architecture according to an embodiment of this application.
Figure 1D:
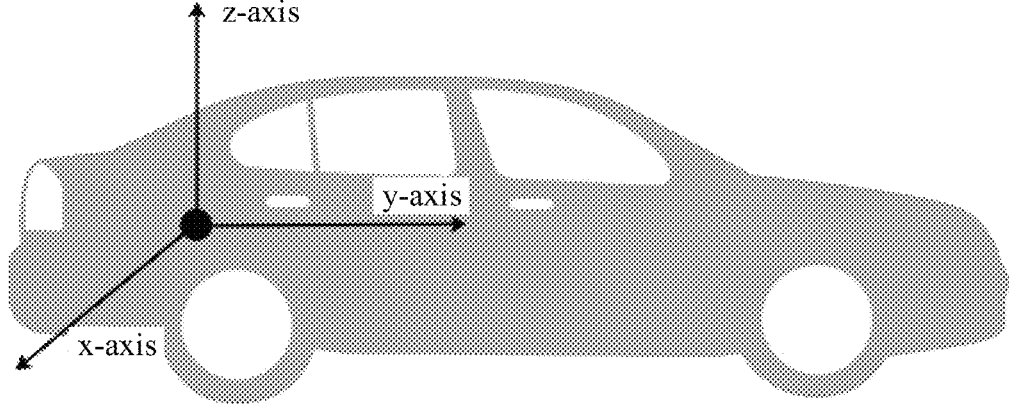
FIG. 1D is yet another schematic diagram of a system architecture according to an embodiment of this application.

In a feasible implementation, the first coordinate system may be a two-dimensional coordinate system, a three-dimensional coordinate system, a polar coordinate system, or another coordinate system. When the first coordinate system is implemented by using a two-dimensional coordinate system, as shown in FIG. 1C, the relative location information relative to the first coordinate system in the vehicle may also be quadrant information of the terminal device in the first coordinate system. The two-dimensional coordinate system is used as an example. Space may be divided into four different quadrants by using an x-axis and a y-axis with an intersection point of the x-axis and the y-axis as an origin (not shown in the figure), which are respectively a first quadrant, a second quadrant, a third quadrant, and a fourth quadrant. When the first coordinate system is implemented by using a three-dimensional coordinate system, as shown in FIG. 1D, there is one coordinate origin and three coordinate axes in different directions, that is, a Cartesian coordinate system (CG). Further, an intersection point of an x-axis, a y-axis, and a z-axis of the three-dimensional coordinate system is the origin. Apparently, terminal devices located at different locations in the vehicle definitely have corresponding coordinates in the coordinate system, that is, relative locations relative to the coordinate system. Certainly, it may be understood that the first coordinate system may also be another coordinate system in the vehicle. For example, the first coordinate system may be several vehicle body coordinate systems that are commonly used in academia and industry, for example, a vehicle body coordinate system defined by an International Organization for Standardization (ISO) international standard, a vehicle body coordinate system defined by the Society of Automotive Engineers (SAE), or a vehicle body coordinate system based on an inertial measurement unit. Certainly, it may be understood that the coordinate system may also be a non-rectangular coordinate system.

In addition, in an implementation, the first location information sent by the network device to the terminal device in step S101 may be code of a location (a single location or a plurality of locations) indicated by the first location information, for example, an index (001/002/003 . . . ) or an identifier (A/B/C . . . ). Alternatively, the first location information may be a location (a single location or multiple locations) indicated by the first location, for example, a Chinese pinyin, an English full name, or an English abbreviation of the location indicated by the first location information. Alternatively, the first location information may be implemented in another manner. This is not limited herein. When the first location information is implemented by using code of the first location information, the network device may prestore a first mapping relationship between the first location information and the first location, and the terminal device may prestore a second mapping relationship between second location information and the first location. The second mapping relationship may be equivalent to the first mapping relationship (for example, as shown in Table 1), or may be an implementation (for example, as shown in Table 2) that is different from the first mapping relationship and that is preset by a manufacturer when the terminal device is delivered from a factory.

TABLE 1

| Location | First location information | Second location information |
|---|---|---|
| Left front door | 001 | 001 |
| Right front door | 010 | 010 |
| Left rear door | 011 | 011 |

TABLE 1-continued

| Location | First location information | Second location information |
|---|---|---|
| Right rear door | 100 | 100 |
| Driver seat | 101 | 101 |
| Passenger seat | 110 | 110 |
| . . . | . . . | . . . |

TABLE 2

| Location | First location information | Second location information |
|---|---|---|
| Left front door | 001 | X001 |
| Right front door | 010 | X002 |
| Left rear door | 011 | X003 |
| Right rear door | 100 | X004 |
| Driver seat | 101 | X005 |
| Passenger seat | 110 | X006 |
| . . . | . . . | . . . |

In an implementation, the first configuration information may indicate, in a plurality of manners, that a feature of the at least one terminal device matches the first feature.

(1) The first configuration information is used to configure at least one communications parameter and/or a device state for at least one terminal device that has the first location information.

(2) The first configuration information is used to configure at least one communications parameter and/or a device state for at least one terminal device that is located at the location indicated by the first location information.

(3) The first configuration information is used to configure at least one communications parameter and/or a device state for at least one terminal device that belongs to an area indicated by the first location information.

(4) The first configuration information is used to configure at least one communications parameter and/or a device state for at least one terminal device that is located at an area indicated by the first location information.

(5) The first configuration information is used to configure at least one communications parameter and/or a device state for at least one terminal device whose location information belongs to the first location information.

2. The first feature information is first type iinformation.

The first type information is used to indicate at least one device type. In this case, the first configuration information is used to configure at least one communications parameter and/or a device state for at least one terminal device whose type information is the first type information. Alternatively, the first configuration information is used to configure at least one communications parameter and/or a device state for at least one terminal device that belongs to the at least one device type indicated by the first type information. Further, the first feature information may include the first type information, and it may be determined, in a plurality of manners, that the feature of the terminal device matches the first feature, so that the network device can configure the terminal device based on the device type information in a targeted manner.

Different type information may be defined by vehicle factory pre-configuration or pre-stipulation in a protocol, or may be a plurality of pieces of preconfigured type information. For example, different device types are defined for different terminal devices based on functions of the devices. The first type information may indicate a terminal device of an air supply type, a terminal device of a lighting supply type, or other type information. For another example, the device may be classified into a microphone device, a loudspeaker device, a display device, and the like.

3. The first feature information is first priority information.

The first priority information is used to indicate at least one device type. In this case, the first configuration information is used to configure at least one communications parameter and/or a device state for at least one terminal device whose priority information is the first priority information. Alternatively, the first configuration information is used to configure at least one communications parameter and/or a device state for at least one terminal device that belongs to the at least one device priority indicated by the first priority information. Further, the first feature information may include the first priority information, and it may be determined, in a plurality of manners, that the feature of the terminal device matches the first feature, so that the network device can configure the terminal device based on the device priority information in a targeted manner.

Different priority information may be defined by vehicle factory pre-configuration or pre-stipulation in a protocol, or may be preconfigured. For example, different device priorities are defined for different terminal devices based on safe driving. The first priority information may indicate a terminal device (for example, a seat belt or an airbag) with a priority closely related to safe driving. The first priority information may indicate a terminal device (for example, an audio and video device or an entertainment device) with a priority weakly related to safe driving, or other priority information.

It may be understood that entertainment devices may be further divided into different priority devices. For example, a microphone has a first priority, and a loudspeaker has a second priority.

The foregoing separately provides examples for description by using an example in which the first feature information is the first location information, the first type information, or the first priority information. In an implementation process of step S101, the first feature information may include one or more of the first location information, the first type information, or the first priority information. Further, the first location information may be used to indicate at least one location, the first type information may be used to indicate at least one device type, and the first priority information may be used to indicate at least one device priority. In other words, the first feature information may include the first location information and the first type information, or the first feature information may include the first location information and the first priority information, or the first feature information may include the first priority information and the first type information, or the first feature information may include the first location information, the first type information, and the first priority information.

Further, the first configuration information is used to configure at least one communications parameter and/or a device state for at least one terminal device whose location information is the first location information, and/or whose type information is the first type information, and/or whose priority information is the first priority information, so that the network device may configure the terminal device based on the one or more pieces of feature information in a targeted manner. Implementation of the first location information, the first type information, and the first priority information is similar to the foregoing content, and details are not described herein again. For example, the first feature information may include a combination of any two or three of the first location information, the first type information, and the first priority information. For example, the first feature indicated by the first feature information is a cockpit driving position and a speaker device, or the first feature indicated by the first feature information is a display device and a first-priority device, or the first feature indicated by the first feature information is a cockpit passenger seat and a second-priority device, or the first feature indicated by the first feature information is a rear seat of the cockpit passenger seat, a microphone device, a third-priority device, and the like.

In step S101, the first configuration information is used to configure the at least one communications parameter and/or the device state for the at least one terminal device that matches the first feature indicated by the first feature information, and the first feature may include one or more features.

The at least one communications parameter includes at least one of transmit power, a modulation and coding scheme, a bit rate, or time-frequency resource configuration information. Optionally, the at least one communications parameter includes transmit power. In other words, the terminal device may configure transmit power of the terminal device based on the first configuration information. For example, the transmit power may be a power value (for example, a power value such as 0.2 watts (W), 0.5 W, or 1 W) or a power range (for example, a power range such as 0.2 W to 1 W or 0.5 W to 0.9 W). This is not limited herein. If the transmit power is a power value, the terminal device may adjust the transmit power based on the power value within a range with an allowed error or required by a system design.

The device state includes an active state or a standby state, that is, the terminal device may configure, based on the device state, the terminal device to enter the active state or configure the terminal device to enter the standby state.

Optionally, the network device may further send a time parameter (for example, a timer Timer) to the terminal device in step S101. The time parameter is associated with the device state configured by using the first configuration information. Subsequently, the terminal device switches the device state when the timer expires. In addition, alternatively, the time parameter may be predefined or preconfigured in the terminal device, or may be defined in a communications protocol. This is not limited herein.

According to the foregoing solution, configuration flexibility of the terminal device is improved, and group configuration or group control of the terminal device can be performed in a targeted manner, thereby improving system performance.

S102. The terminal device determines that a feature of the terminal device matches the first feature.

In this embodiment, the terminal device may have at least one feature. The terminal device determines that the at least one feature of the terminal device matches the first feature.

In step S101, when the terminal device determines, in step S102, that the feature of the terminal device matches the first feature, for example, the feature of the terminal device and the first feature may be the same, corresponding to each other, or mutually included, step S103 is performed. When the terminal device determines, in step S102, that the feature of the terminal device does not match the first feature, for example, the feature of the terminal device and the first feature are different, not corresponding to each other, or not mutually included, the terminal device may perform another operation, for example, the terminal device may ignore the first configuration information received in step S101, send feedback indication information to the network device, wait to receive the next configuration information sent by the network device, or perform another operation. This is not limited herein.

It may be learned from step S101 that the first feature information may be implemented in a plurality of forms, and the network device may configure the terminal device based on the difference of the first feature information in a targeted manner. Correspondingly, there are a plurality of manners in which the terminal device determines, in step S102, that the feature of the terminal device matches the first feature. The following separately describes the manners.

1. The first feature information is the first location information.

The first location information is used to indicate at least one location. In this case, the first configuration information may be used to configure at least one communications parameter and/or a device state for at least one terminal device that matches the first location indicated by the first feature information, so that the network device can configure the terminal device based on the location information in a targeted manner.

Further, the first location information may be location information in a cockpit. The terminal device may be a terminal device in a vehicle, for example, a cockpit device. Because an absolute location of the terminal device may change in a running process of the vehicle, the first location information may be represented by using location information in the cockpit, so that the terminal device is accurately configured based on a relative location of the location information in the cockpit. For example, the first location information may indicate a location of a cockpit driving position, a location of a cockpit front passenger position, a location of a rear seat of the cockpit driving position, or another location.

Optionally, the location information of the terminal device and/or the first location information may also be location information in a vehicle. For example, the location information of the terminal device may be used to indicate a location on a vehicle such as an engine compartment or a trunk.

It may be understood that the location information of the terminal device and/or the first location information may be relative location information relative to the first coordinate system of the vehicle. The first coordinate system may be a two-dimensional coordinate system, a three-dimensional coordinate system, a polar coordinate system, or another coordinate system. For an implementation process, refer to the description in step S101. Details are not described herein again.

It can be learned from step S101 that the first location information sent by the network device to the terminal device may have a plurality of implementations. The first location information may be code of a location indicated by the first location information, for example, an index (001/002/003 . . . ) or an identifier (A/B/C . . . ). Alternatively, the first location information may be a location indicated by the first location, for example, a Chinese pinyin, an English full name, or an English abbreviation of the location indicated by the first location information. Alternatively, the first location information may be implemented in another manner. This is not limited herein. In addition, when the first location information is implemented by using code of a location indicated by the first location information, the network device may prestore the first mapping relationship between the first location information and the first location, and the terminal device may prestore the second mapping relationship between the second location information and the first location. The second mapping relationship may be equivalent to the first mapping relationship (for example, as shown in Table 1), or may be an implementation (for example, as shown in Table 2) that is different from the first mapping relationship and that is preset by a manufacturer when the terminal device is delivered from a factory. In an implementation, a plurality of manners may be used to determine that the feature of the terminal device matches the first feature. In this case, in step S102, there may also be a plurality of processes in which the terminal device determines that the feature of the terminal device matches the first feature, including the following processes.

(1) That the location information of the terminal device is the first location information is determined.

In this embodiment, the feature information of the terminal device includes the location information of the terminal device. In this case, in an implementation, the location information of the terminal device is the same as the first location information. As is similar to implementation of the first location information, the location information of the terminal device may be code (for example, an index (001/002/003 . . . ), an identifier (A/B/C . . . ), Chinese pinyin, an English full name, or an English abbreviation of a location (a single location or a plurality of locations) indicated by the location information of the terminal device. Alternatively, another implementation may be used. This is not limited herein.

In step S102, the terminal device determines, by using the second mapping relationship, that code of a location indicated by the location information of the terminal device is the same as the code of the first location indicated by the first location information, or the terminal device determines that a location indicated by the location information of the terminal device is the same as the first location indicated by the first location information. The second mapping relationship may be prestored in the terminal device or preconfigured for the terminal device.

(2) That a location indicated by the location information of the terminal device is the same as the location indicated by the first location information is determined.

In this embodiment, the feature information of the terminal device includes the location information of the terminal device. In this case, in an implementation, the location information of the terminal device may be code of a location indicated by the location information of the terminal device, and the first location information may be code of the first location indicated by the first location information.

In step S102, a location that is corresponding to the code of the first location and that is determined by the terminal device based on the second mapping relationship is the same as a location indicated by the code of the location information of the terminal device. The second mapping relationship may be prestored in the terminal device or preconfigured for the terminal device.

(3) That a location indicated by the location information of the terminal device belongs to an area indicated by the first location information.

In this embodiment, the feature information of the terminal device includes the location information of the terminal device. In this case, in an implementation, the location information of the terminal device may be code of the location indicated by the location information of the terminal device, and the first location information may be code of an area in which a plurality of locations indicated by the first location information are located.

In step S102, the terminal device determines that the code of the location indicated by the location information of the terminal device is included in the code of the area in which the plurality of locations indicated by the first location information are located.

(4) That the terminal device is located in an area indicated by the first location information is determined.

In this embodiment, the feature information of the terminal device includes the location information of the terminal device. In this case, in an implementation, the location information of the terminal device may be code of the location indicated by the location information of the terminal device, and the first location information may be code of an area in which a plurality of locations indicated by the first location information are located.

In step S102, the terminal device determines, in the second mapping relationship, area location information corresponding to the code of the area in which the plurality of locations indicated by the first location information are located, and further determines that the location indicated by the code of the location information of the terminal device is located in the area location. The second mapping relationship may be prestored in the terminal device or preconfigured for the terminal device.

(5) That the location information of the terminal device belongs to the first location information is determined.

In this embodiment, the feature information of the terminal device includes the location information of the terminal device. In this case, in an implementation, the location information of the terminal device may be a location indicated by the location information of the terminal device, and the first location information may be a plurality of locations indicated by the first location information. Alternatively, the location information of the terminal device may be code of a location indicated by the location information of the terminal device, and the first location information may be code of an area in which a plurality of locations indicated by the first location information are located.

In step S102, the terminal device determines that the location indicated by the location information of the terminal device is included in the plurality of locations indicated by the first location information, or the terminal device determines that the code of the location indicated by the location information of the terminal device is included in the code of the area in which the plurality of locations indicated by the first location information are located.

In the foregoing embodiment in which the first feature information is the first location information, the terminal device may determine the location information of the terminal device in a plurality of implementations. The location information of the terminal device may be preconfigured by the network device for the terminal device, or may be preconfigured or predefined when the terminal device is delivered from a factory. This is not limited herein.

2. The first feature information is the first type information.

The first type information is used to indicate at least one device type. In this case, the first configuration information may be used to configure at least one communications parameter and/or a device state for at least one terminal device that matches the first type, so that the network device can configure the terminal device based on the type information in a targeted manner.

Further, in step S102, a process in which the terminal device determines that the feature of the terminal device matches the first feature may include that the terminal device determines that type information of the terminal device is the first type information. Alternatively, the terminal device determines that a type of the terminal device belongs to the at least one device type indicated by the first type information. In this case, the terminal device may determine, in a plurality of manners, that the feature of the terminal device matches the first feature, so that the network device can configure the terminal device based on the device type information in a targeted manner.

3. The first feature information is the first priority information.

The first priority information is used to indicate at least one device priority. In this case, the first configuration information may be used to configure at least one communications parameter and/or a device state for at least one terminal device that matches the first priority, so that the network device can configure the terminal device based on the priority information in a targeted manner.

Further, in step S102, a process in which the terminal device determines that the feature of the terminal device matches the first feature may include that the terminal device determines that priority information of the terminal device is the first priority information. Alternatively, the terminal device determines that a priority of the terminal device belongs to the at least one device priority indicated by the first priority information. In this case, the terminal device may determine, in a plurality of manners, that the feature of the terminal device matches the first feature, so that the network device can configure the terminal device based on the device priority information in a targeted manner.

The foregoing separately provides examples for description by using an example in which the first feature information is the first location information, the first type information, or the first priority information. It can be learned from the description of step S101 that the first feature information may include one or more of the first location information, the first type information, and the first priority information. In other words, the first feature information may include the first location information and the first type information, or the first feature information may include the first location information and the first priority information, or the first feature information may include first priority information and the first type information, or the first feature information may include the first location information, the first type information, and the first priority information. When the first feature information includes a plurality of pieces of feature information, the first configuration information is used to perform corresponding configuration for the terminal device that matches all of a plurality of features indicated by the plurality of pieces of feature information. The first location information may be used to indicate at least one location, the first type information may be used to indicate at least one device type, and the first priority information may be used to indicate at least one device priority. In this case, the first configuration information is used to configure at least one communications parameter and/or a device state for at least one terminal device whose location information is the first location information, and/or whose type information is the first type information, and/or whose priority information is the first priority information.

In this case, in a scenario in which the first feature information includes a plurality of pieces of feature information, in step S102, that the terminal device determines that the feature of the terminal device matches the first feature includes that the terminal device determines that the feature of the terminal device matches the plurality of features indicated by the first feature information (that is, the first feature includes a plurality of features). In other words, the terminal device has a plurality of features indicated by the first feature information (that is, the first feature includes a plurality of features). Therefore, the network device can configure the terminal device that matches the plurality of features indicated by the first feature information. For a manner in which the terminal device determines that the feature matches the plurality of features indicated by the first feature information, refer to the foregoing description of each type of feature information. For example, if the first feature information includes the first location information and first type information, it is determined, with reference to the foregoing manner in which the first feature information is the first location information and the first feature information is the first type information, that the feature of the terminal device matches the plurality of features indicated by the first feature information. For another example, if the first feature information includes the first location information and the first priority information, it is determined, with reference to the foregoing manner in which the first feature information is the first location information and the first feature information is the first priority information, that the feature of the terminal device matches the plurality of features indicated by the first feature information. Another possible combination manner of the first feature information may be processed in a similar manner, and details are not described herein again. Then, the terminal device triggers to perform step S103. In step S102, if the at least one feature of the terminal device does not include any one of the one or more pieces of feature information, that is, a set corresponding to the at least one feature of the terminal device is not a parent set of a set corresponding to one or more of the first location information, the first type information, and the first priority information, or the terminal device does not have at least one of the plurality of features indicated by the first feature information, the terminal device determines that the feature of the terminal device does not match the first feature. Then, the terminal device triggers to perform step S103. The terminal device may perform another operation, for example, ignore the first configuration information received in step S101, send feedback indication information to the network device, wait to receive next configuration information sent by the network device, or perform another operation. This is not limited herein. In this way, the network device may configure the terminal device based on one or more pieces of feature information in the first location information in a targeted manner, the first type information, and the first priority information. Implementation of the first location information, the first type information, and the first priority information is similar to the foregoing content, and details are not described herein again.

S103. The terminal device configures the terminal device based on the first configuration information.

In this embodiment, the terminal device configures the terminal device based on the first configuration information obtained in step S101.

It can be learned from step S101 that the first configuration information is used to configure the at least one communications parameter and/or the device state for the at least one terminal device that matches the first feature indicated by the first feature information.

The at least one communications parameter includes at least one of transmit power, a modulation and coding scheme, a bit rate, or time-frequency resource configuration information. Optionally, the at least one communications parameter includes transmit power. In other words, the terminal device may configure transmit power of the terminal device based on the first configuration information. For example, the transmit power may be a power value (for example, a power value such as 0.2 W, 0.5 W, or 1 W) or a power range (for example, a power range such as 0.2 W to 1 W or 0.5 W to 0.9 W). This is not limited herein. If the transmit power is a power value, the terminal device may adjust the transmit power based on the power value within a range with an allowed error or required by a system design.

The device state includes an active state and a standby state, that is, the terminal device may configure, based on the device state, the terminal device to enter the active state or configure the terminal device to enter the standby state. The network device may further send a time parameter (for example, a timer) to the terminal device in step S101. The time parameter is associated with the device state configured by using the first configuration information. Subsequently, the terminal device switches the device state when the timer expires. In addition, alternatively, the time parameter may be predefined or preconfigured in the terminal device. This is not limited herein.

According to the foregoing solution, configuration flexibility of the terminal device is improved, and group configuration or group control of the terminal device can be performed in a targeted manner, thereby improving system performance.

In an interaction process between the network device and the terminal device in the foregoing step S101 to step S103, in an intelligent cockpit scenario, a case in which the first feature information is the first location information is used as an example. The intelligent cockpit service may provide a feature based on a location service, for example, based on a change of a passenger location and perception of a user location, fast group wake-up (or batch wake-up) is performed on in-vehicle terminal devices around the user. After the passenger leaves, a sensor device (which is a type of terminal device) at a corresponding location sleeps, to implement energy saving. For example, when there is a passenger at a location, an in-vehicle terminal device attached to the location needs to be quickly ready, to provide a service for the user. In another possible intelligent scenario of a non-cockpit scenario, the terminal device may also be configured and controlled in a targeted manner based on at least one of a location, a priority, and a device type, thereby improving configuration flexibility and system performance.

In this embodiment, the terminal device receives the first feature information and the first configuration information from the network device. The first configuration information is used to configure at least one communications parameter and/or a device state for at least one terminal device that matches the first feature. Then, when the terminal device determines that the feature of the terminal device matches the first feature, the terminal device is configured based on the first configuration information. The terminal device may be a terminal device in a vehicle, and the terminal device may include at least one feature. In a wireless communications process between the network device and the terminal device, after the terminal device receives the first feature information and the first configuration information from the network device, when the at least one feature of the terminal device matches the first feature, the terminal device is configured based on the first configuration information, so that wireless communications between the network device and the terminal device in the vehicle can be implemented based on the first feature information and the first configuration information, thereby avoiding problems such as cabling complexity and difficulty in wired communications, and improving system reliability and maintainability.

In the embodiment shown in FIG. 2, the network device may implement configuration of the terminal device in a plurality of manners such as unicast, multicast, and broadcast. Particularly, when the network device implements configuration of the terminal device in a multicast manner, in a wireless communications environment, due to uncertainty of a wireless communications link, how to ensure reliable feedback of multicast communication is a problem that needs to be resolved. The following resolves the problem by using another embodiment shown in FIG. 3.

Refer to FIG. 3. An embodiment of this application provides another wireless communications method including the following steps.

S201. A network device sends first information in a multicast manner.

In this embodiment, the network device sends the first information in a multicast manner. Correspondingly, a terminal device receives, in step S201, the first information sent by the network device in a multicast manner. Therefore, the network device can implement wireless communications between the network device and the terminal device in a multicast manner, thereby improving communications efficiency.

In a process in which the network device sends the first information to the terminal device in a multicast manner, the multicast manner may be implemented by sending the first information by using a specified MCH or BCH, or may be implemented by scrambling, by the network device, the sent first information by using a specified multicast identifier. Alternatively, the target address in the first information may include a first multicast address. Alternatively, another multicast manner may be used. This is not limited herein.

In an implementation process of step S201, the first information includes data and/or control signaling.

(1) The first information includes data.

In a wireless communications process between the network device and the terminal device, the network device may send data in a multicast manner in step S201. Further, the data may be audio data, used to indicate audio data played on a loudspeaker, or the data may be video data, used to play video data on a display, or the data may be data in another form or service. This is not limited herein.

(2) The first information includes control signaling,

In a wireless communications process between the network device and the terminal device, the network device may send control signaling in a multicast manner in step S201, so that the network device may implement group control (or as batch configuration) on the terminal device based on the control signaling sent in a multicast manner, for example, group configuration, group activation, and group sleep. This group control processing manner can save signaling and improve communications system performance.

Further, the control signaling may be used by the network device to control all terminal devices in a multicast group that communicates in the multicast manner. In addition, implementation of the control signaling may also be used by the network device to control some terminal devices in the multicast group that communicates in the multicast manner. In this case, the control signaling may carry identification information of some terminal devices, so that the network device can perform targeted control on the terminal devices. When the network device controls some terminal devices in the multicast group that communicates in the multicast manner, further, the control signaling may include the first feature information and the first configuration information in the embodiment shown in FIG. 2, so as to cooperate with the first configuration information to implement targeted control on the terminal devices. The first feature information may include one or more of the first location information, the first type information, and the first priority information. The first location information may be used to indicate at least one location, the first type information may be used to indicate at least one device type, and the first priority information may be used to indicate at least one device priority. For an implementation process of the first feature information and the first configuration information, refer to the content of the embodiment shown in FIG. 2. Details are not described herein again.

S202. The network device sends resource configuration information to the terminal device.

In this embodiment, the network device sends the resource configuration information to the terminal device. Correspondingly, the terminal device receives the resource configuration information from the network device in step S202, where the resource configuration information is used to configure a feedback resource set.

Further, the resource configuration information may be carried in a unicast message sent by the network device to the terminal device, so that the network device separately sends the resource configuration information to different terminal devices one by one to implement feedback resource configuration, or may be carried in a multicast message sent by the network device to the terminal device, so that the network device separately sends the resource configuration information to terminal devices in different multicast groups to implement group configuration of feedback resources. Alternatively, the resource configuration information may be carried in a broadcast message sent by the network device to the terminal devices or in another implementation. This is not limited herein. In addition, the first information sent by the network device in step S201 and the resource configuration information sent by the network device in step S202 may be carried in a same message, or may be separately carried in different messages. This is not limited herein.

In an implementation, the feedback resource set includes a feedback resource used by at least one terminal device for the first information, and the at least one terminal device belongs to a same multicast group. In step S202, the terminal device receives the resource configuration information from the network device to configure the feedback resource set. The feedback resource set includes feedback resources used by terminal devices in a same multicast group for the first information. In other words, the network device may configure a same feedback resource set for the terminal devices in the same multicast group, the network device may implement wireless communication between the network device and the terminal device by using the group configuration of the feedback resource, thereby improving communication efficiency.

It should be noted that the resource configuration information sent by the network device in step S202 is used to configure the feedback resource set, and the feedback resource set includes a first feedback resource. Further, the feedback resource set may further include a second feedback resource, a third feedback resource, and the like, and is used to configure corresponding feedback resources for different terminal devices or different terminal device groups. A quantity of feedback resources included in the feedback resource set is not limited in this application, and may be set based on a communication scenario and a requirement. The resource configuration information sent by the network device in step S202 may be associated with the first information, that is, the feedback resource set (which may include the first feedback resource, the second feedback resource, the third feedback resource, and/or the like) configured by using the resource configuration information, and is used by different terminal devices or different terminal device groups to send a receiving feedback for the first information by using different feedback resources. For example, there may be a correspondence between the resource configuration information and the first information sent by the network device in step S201. The correspondence may be explicit. For example, the resource configuration information carries an indication identifier of the first information. Alternatively, the first information carries an identifier of the resource configuration information, to determine that the resource configured by using the resource configuration information corresponds to or is related to the first information. For example, the resource is used to feed back the first information. In another possible design, the correspondence is implemented in another explicit manner. In another possible design, the correspondence may alternatively be implicit. For example, when an interval between a sending time (or a receiving time, and a receiving/sending delay caused in actual communication may be ignored or temporarily not considered) of the resource configuration information and the first information is within a predetermined threshold, the terminal device may determine that the feedback resource set configured by using the resource configuration information corresponds to or is related to the first information. Alternatively, when the resource configuration information and the first information are carried in a same message, it is determined that the feedback resource set configured by using the resource configuration information corresponds to or is related to the first information. This is not limited herein.

In an implementation, the feedback resource set further includes a second feedback resource. The at least one terminal device includes a second terminal device, and the feedback resource set is used as a feedback resource for the first information by terminal devices in a same multicast group. Further, the feedback resource set includes the first feedback resource and the second feedback resource. The first feedback resource and the second feedback resource may be used for different terminal devices (that is, the terminal device and the second terminal device in step S202) in a same multicast group. In addition, the first feedback resource and the second feedback resource may be orthogonal to each other, partially overlapped, or completely overlapped, which are separately described in the following.

(1) The first feedback resource is orthogonal to the second feedback resource used for the second terminal device. In step S202, to avoid a conflict generated when multiple terminal devices in a same multicast group send information by using overlapping or partially overlapping feedback resources, feedback resources that are orthogonal to each other may be configured for different terminal devices in a same multicast group.

It should be noted that the network device or the protocol may define a rule, so that feedback resources used for different terminal devices in a same multicast group are exactly orthogonal to each other. Resources being orthogonal to each other means that time-frequency resources do not overlap in both a time domain and a frequency domain.

(2) The first feedback resource partially or completely overlaps with the second feedback resource used for the second terminal device. In step S202, considering that most terminal devices can successfully receive a multicast message when a radio channel is relatively good or a multicast parameter is relatively properly configured, in this case, only a terminal device that fails to receive the multicast message may be required to send a feedback. For example, because a probability that both a device A and a device B fail to perform receiving is relatively low, overlapping feedback resources may be configured for the device A and the device B. In this case, when the device A fails to receive a first message, the device A sends a feedback by using the feedback resource, or when the device B fails to receive a first message, the device B sends a feedback by using the feedback resource. That is, overlapping or partially overlapping feedback resources may be configured for a plurality of devices, to maximize feedback resource utilization. Therefore, feedback resources partially or completely overlapping may be configured for different terminal devices in a same multicast group.

In addition, in an implementation process of step S202, the network device may separately send a plurality of pieces of resource configuration information to terminal devices corresponding to different multicast groups. Considering that terminal devices in different multicast groups may send feedback information at a same moment, feedback resources configured by using the plurality of pieces of resource configuration information may be orthogonal to each other. Alternatively, feedback resource sets configured by using resource configuration information of different multicast groups do not overlap in a time domain or a frequency domain, that is, the feedback resource sets configured by using the resource configuration information of different multicast groups do not interfere with each other. Therefore, it can be ensured that terminal devices in different multicast groups do not conflict with each other when using respective feedback resources. Similarly, the network device may configure shared feedback resources for terminal devices in different multicast groups, that is, feedback resource sets determined by using resource configuration information of different multicast groups partially or completely overlap, thereby saving feedback resources to a relatively large extent.

S203. The terminal device determines the first feedback resource based on the resource configuration information.

In this embodiment, the terminal device determines the first feedback resource based on the resource configuration information obtained in step S202.

Further, the first feedback resource includes at least one of a time domain resource and a frequency domain resource.

In an implementation, a process in which the terminal device determines the first feedback resource based on the resource configuration information in step S203 may include the following steps.

(1) The resource configuration information includes a first feedback identifier and first resource configuration information used to configure the first feedback resource. The terminal device determines the first feedback resource based on the first feedback identifier and the first resource configuration information. The first resource configuration information belongs to the feedback resource set.

Further, the resource configuration information may further include a second feedback identifier and second resource configuration information used to configure the second feedback resource. The resource configuration information may further include another feedback identifier and other resource configuration information used to configure another feedback resource. This is not limited herein. That is, the feedback resource set configured by using the resource configuration information includes feedback resources corresponding to a plurality of feedback identifiers. It should be noted that the identifier may be an index or in another form. The plurality of identifiers is referred to as feedback identifiers only for description from a function perspective, and a type of the identifiers are not limited.

In step S203, the terminal device determines the first feedback resource based on the first feedback identifier of the terminal device. The terminal device may have at least one identifier, for example, an international mobile equipment identity (IMEI), a mobile equipment identity (MEID), or another identifier, and the at least one identifier includes the first feedback identifier. The terminal device determines a feedback resource corresponding to the first feedback identifier as the first feedback resource.

(2) The terminal device determines the first feedback resource based on a first parameter and the resource configuration information.

In step S203, the terminal device determines the first feedback resource based on the first parameter of the terminal device and the resource configuration information. The first feedback resource belongs to the feedback resource set configured by using the resource configuration information. A rule for determining the first feedback resource based on the first parameter may be defined in a protocol. The first parameter may be pre-stored in each terminal device, that is, the terminal device determines the first feedback resource based on the pre-stored first parameter. It may be understood that, in a feasible implementation, different terminal devices in a same multicast group correspond to different first parameters, to ensure that the different terminal devices obtain mutually orthogonal feedback resources based on the first parameter.

It may be understood that, in another feasible implementation, first parameters corresponding to different terminal devices in a same multicast group may be the same, or first parameters corresponding to at least two terminal devices in a same multicast group may be the same, so as to implement shared use of feedback resources.

Optionally, the first parameter may be a value. For example, if a multicast group includes 10 terminal devices, each terminal device may include a preconfigured value, for example, 0, 1, . . . , 9. In this case, a terminal device whose first parameter is 0 may determine a time-frequency resource whose index is 0 in the feedback resource set as a feedback resource, a terminal device whose first parameter is 1 determines a time-frequency resource whose index is 1 in the feedback resource set as a feedback resource, and so on.

It may be understood that the feedback resource may also be determined by using an operation manner including the first parameter. This is not limited in the present disclosure.

In the foregoing plurality of implementations, the first parameter may be predefined or preconfigured. The first parameter may be preconfigured in the terminal device. Further, the first parameter may be configured by the network device for the terminal device, or may be predefined in the terminal device. This is not limited herein.

In the foregoing plurality of implementations, the first feedback identifier may be predefined or preconfigured. The first feedback identifier may be preconfigured in the terminal device. Further, the first feedback identifier may be configured by the network device for the terminal device, or may be predefined in the terminal device. This is not limited herein.

S204. The terminal device sends feedback information for the first information to the network device on the first feedback resource.

In this embodiment, the terminal device sends the feedback information for the first information to the network device on the first feedback resource. Correspondingly, in step S204, the network device receives, on the first feedback resource, the feedback information for the first information from the terminal device.

Further, the terminal device sends, to the network device on the first feedback resource determined in step S203, the feedback information for the first information received in step S201. When the first information sent by the network device in step S201 and the resource configuration information sent by the network device in step S202 are respectively carried in different messages, the terminal device may successfully receive the first information, or may not successfully receive the first information. Therefore, in step S204, the terminal device sends feedback information of the first information to the network device, to indicate, to the network device by using the feedback information, that the terminal device successfully receives the first information, or indicate, to the network device by using the feedback information, that the terminal device fails to receive the first information.

In addition, the terminal device sends, on the first feedback resource, an indication message that carries the feedback information of the first information. The indication message may have a plurality of implementations. For example, in the indication message, a field "1" is used to identify that the first information is successfully received, and a field "0" is used to identify that the first information is not successfully received. Alternatively, the indication message may carry identity information of the terminal device to identify that the first information is successfully received. It may be understood that the identity information of the terminal device is used to uniquely identify an identity of the secondary node in a communications domain. Alternatively, the indication message that carries the feedback information of the first information is sent in another implementation. This is not limited herein.

In a feasible implementation, as described in step S202, considering that when a radio channel is relatively good or a multicast parameter is relatively properly configured, most terminal devices can successfully receive a multicast message, in this case, in step S204, only a terminal device that fails to successfully receive the first information sends a feedback message. In an example, the feedback message is used to indicate, to the network device, that the terminal device fails to receive the first information. For example, if the first information is data, after the terminal device successfully receives the data in step S201, and determines the first feedback resource in step S203, the terminal device sends feedback information to the network device in step S204, to indicate that the terminal device successfully receives the data. If the first information is control signaling, after the terminal device successfully receives the control signaling in step S201 and determines the first feedback resource in step S203, the terminal device sends feedback information to the network device in step S204 to indicate that the terminal device successfully receives the control signaling or that the terminal device has performed a corresponding operation based on the control signaling. In this way, group control can be performed on a plurality of terminal devices in a vehicle or a smart device, and a status of receiving the group control by the terminal device is determined based on feedback information, thereby improving communications performance and efficiency.

In this embodiment, the terminal device receives the first information sent by the network device in a multicast manner. In addition, the terminal device receives the resource configuration information from the network device, where the resource configuration information is used to configure the feedback resource set. Then, the terminal device may determine the first feedback resource based on the resource configuration information, where the feedback resource set includes the first feedback resource. Further, the terminal device sends the feedback information for the first information to the network device on the first feedback resource. The resource configuration information is used to configure the feedback resource set, and the feedback resource set includes the first feedback resource. In a wireless communications process between the network device and the terminal device, the terminal device may determine the first feedback resource based on the resource configuration information from the network device, and the terminal device may send the feedback information for the first information to the network device on the first feedback resource. The first message is sent by the network device in a multicast manner. In an example, the terminal device sends, on the first feedback resource, the feedback message for the first information sent in a multicast manner, to implement wireless communications between the network device and the terminal device in the vehicle. This avoids problems such as cabling complexity and difficulty in wired communications, improves data transmission security of multicast information in a wireless communications process, and improves system reliability and maintainability.

The foregoing describes embodiments of this application from a perspective of a method. The following describes the terminal device and the network device in embodiments of this application from a perspective of specific apparatus implementation.

Figure 4:
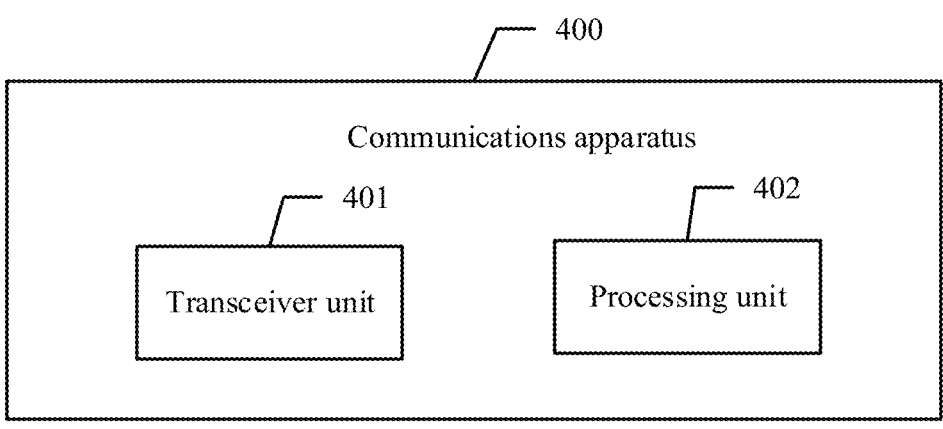
FIG. 4 is a schematic diagram of a communications apparatus according to an embodiment of this application.

Refer to FIG. 4. An embodiment of this application provides a communications apparatus. The communications apparatus 400 can implement functions of the terminal device in the foregoing method embodiments, and therefore can also implement beneficial effects of the foregoing method embodiments. In embodiments of this application, the communications apparatus may be a terminal device, or may be an integrated circuit, an element, or the like inside a terminal device, for example, a chip.

The communications apparatus 400 includes a transceiver unit 401 and a processing unit 402.

The transceiver unit 401 is configured to receive first feature information and first configuration information from a network device. The first feature information is used to indicate a first feature. The first configuration information is used to configure at least one communications parameter and/or a device state for at least one terminal device that matches the first feature.

The processing unit 402 is configured to determine that a feature of the terminal device matches the first feature.

The processing unit 402 is further configured to configure the terminal device based on the first configuration information.

In an implementation, the first feature information includes first location information.

The processing unit 402 is configured to determine that location information of the terminal device is the first location information, or determine that a location indicated by location information of the terminal device is the same as a location indicated by the first location information, or determine that a location indicated by location information of the terminal device belongs to an area indicated by the first location information, or determining that the terminal device is located in an area indicated by the first location information, or determine that location information of the terminal device belongs to the first location information.

In an implementation, the location information of the terminal device is preconfigured or predefined.

In an implementation, the location information of the terminal device and/or the first location information are/is location information in a cockpit.

In an implementation, the first feature information includes first type information, and the first type information is used to indicate at least one device type.

The processing unit 402 is configured to determine that type information of the terminal device is the first type information, or determine that a type of the terminal device belongs to the at least one device type indicated by the first type information.

In an implementation, the first feature information includes first priority information, and the first priority information is used to indicate at least one device priority.

The processing unit 402 is configured to determine that priority information of the terminal device is the first priority information, or determine that a priority of the terminal device belongs to the at least one device priority indicated by the first priority information.

In an implementation, the at least one communications parameter includes transmit power, and/or the device state includes an active state or a standby state.

In an implementation, the processing unit 402 is configured to configure the at least one communications parameter and/or the device state of the terminal device based on the first configuration information.

It should be noted that for specific content such as an information execution process of the units of the communications apparatus 400, refer to descriptions in the foregoing method embodiments of this application. Details are not described herein again.

Figure 5:
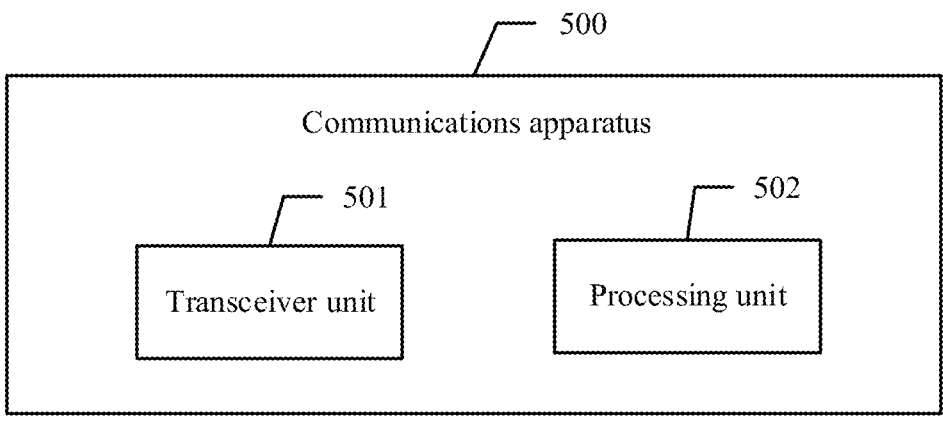
FIG. 5 is another schematic diagram of a communications apparatus according to an embodiment of this application.

Refer to FIG. 5. An embodiment of this application provides another communications apparatus. The communications apparatus 500 can implement functions of the network device in the foregoing method embodiments, and therefore can also implement beneficial effects of the foregoing method embodiments. In embodiments of this application, the communications apparatus may be a network device, or may be an integrated circuit, an element, or the like inside a network device, for example, a chip.

The communications apparatus 500 includes a transceiver unit 501 and a processing unit 502.

The processing unit 502 is configured to determine first feature information and first configuration information. The first feature information is used to indicate a first feature. The first configuration information is used to configure at least one communications parameter and/or a device state for at least one terminal device that matches the first feature.

The transceiver unit 501 is configured to send the first feature information and the first configuration information to a terminal device.

In an implementation, the first feature information includes first location information.

The first configuration information is used to configure at least one communications parameter and/or a device state for at least one terminal device located at a location indicated by the first location information, or the first configuration information is used to configure at least one communications parameter and/or a device state for at least one terminal device located in an area indicated by the first location information, or the first configuration information is used to configure at least one communications parameter and/or a device state for at least one terminal device whose location information belongs to the first location information.

In a specific implementation, the first location information is location information in a cockpit.

In an implementation, the first feature information includes first type information, and the first type information is used to indicate at least one device type. the first configuration information is used to configure at least one communications parameter and/or a device state for at least one terminal device whose type information is the first type information, or the first configuration information is used to configure at least one communications parameter and/or a device state for at least one terminal device that belongs to at least one device type indicated by the first type information.

In an implementation, the first feature information includes first priority information, and the first priority information is used to indicate at least one device priority.

The first configuration information is used to configure at least one communications parameter and/or a device state for at least one terminal device whose priority information is the first priority information, or the first configuration information is used to configure at least one communications parameter and/or a device state for at least one terminal device that belongs to the at least one device priority indicated by the first priority information.

In an implementation, the at least one communications parameter includes transmit power, and/or the device state includes an active state or a standby state.

It should be noted that for specific content such as an information execution process of the units of the communications apparatus 500, refer to descriptions in the foregoing method embodiments of this application. Details are not described herein again.

Figure 6:
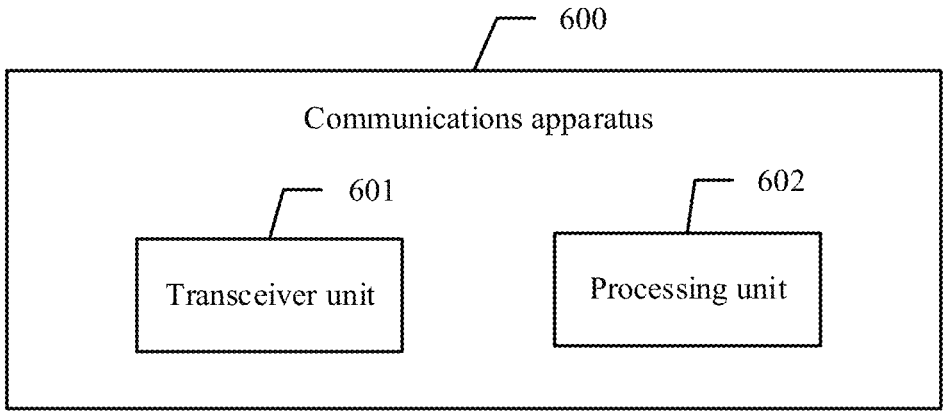
FIG. 6 is still another schematic diagram of a communications apparatus according to an embodiment of this application.
Figure 7:
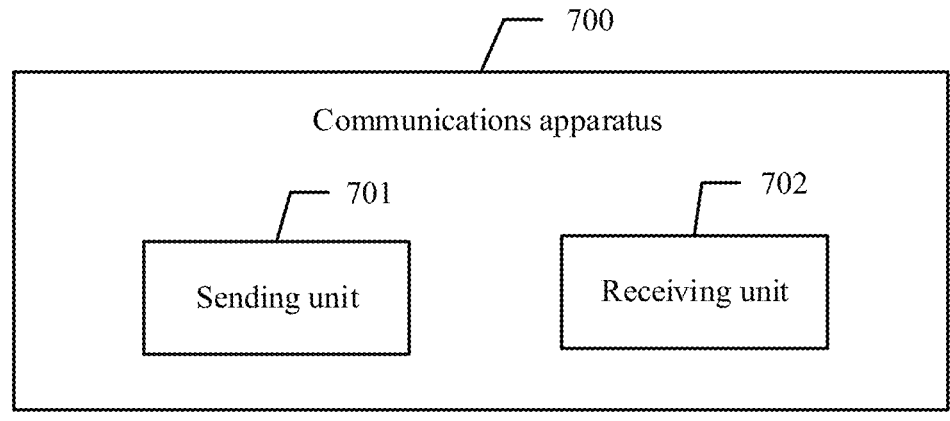
FIG. 7 is yet another schematic diagram of a communications apparatus according to an embodiment of this application.

Refer to FIG. 6. An embodiment of this application provides still another communications apparatus. The communications apparatus 600 can implement functions of the terminal device in the foregoing method embodiments, and therefore can also implement beneficial effects of the foregoing method embodiments. In embodiments of this application, the communications apparatus may be a terminal device, or may be an integrated circuit, an element, or the like inside a terminal device, for example, a chip.

The communications apparatus 600 includes a transceiver unit 601 and a processing unit 602.

The transceiver unit 601 is configured to receive first information sent by a network device in a multicast manner.

The transceiver unit 601 is further configured to receive resource configuration information from the network device, where the resource configuration information is used to configure a feedback resource set.

The processing unit 602 is configured to determine a first feedback resource based on the resource configuration information, and the feedback resource set includes the first feedback resource.

The transceiver unit 601 is further configured to send feedback information for the first information to the network device on the first feedback resource.

In an implementation, the first information includes data and/or control signaling.

In an implementation, the feedback resource set includes a feedback resource used by at least one terminal device for the first information, and the at least one terminal device belongs to a same multicast group.

In an implementation, the feedback resource set further includes a second feedback resource, and the at least one terminal device includes a second terminal device.

The first feedback resource is orthogonal to the second feedback resource used for the second terminal device, or the first feedback resource partially or completely overlaps with the second feedback resource used for the second terminal device.

In an implementation, the processing unit 602 is configured to determine the first feedback resource based on a first parameter of the terminal device and the resource configuration information.

Further optionally, the first parameter is predefined or preconfigured.

In an implementation, the resource configuration information includes a first feedback identifier and first resource configuration information used to configure the first feedback resource. The first feedback resource is used by at least one terminal device whose feedback identifier is the first feedback identifier.

The processing unit 602 is configured to, when the feedback identifier of the terminal device is the first feedback identifier, determine the first feedback resource based on the first resource configuration information.

It should be noted that for specific content such as an information execution process of the units of the communications apparatus 600, refer to descriptions in the foregoing method embodiments of this application. Details are not described herein again.

An embodiment of this application provides another communications apparatus. The communications apparatus 700 can implement functions of the network device in the foregoing method embodiments, and therefore can also implement beneficial effects of the foregoing method embodiments. In embodiments of this application, the communications apparatus may be a network device, or may be an integrated circuit, an element, or the like inside a network device, for example, a chip.

The communications apparatus 700 includes a sending unit 701 and a receiving unit 702.

The sending unit 701 is configured to send first information in a multicast manner.

The sending unit 701 is further configured to send resource configuration information to a terminal device, where the resource configuration information is used to configure a feedback resource set, and the feedback resource set includes a first feedback resource.

The receiving unit 702 is configured to receive, on the first feedback resource, feedback information that is for the first information and that is from the terminal device.

In an implementation, the first information includes data and/or control signaling.

In an implementation, the feedback resource set includes a feedback resource used by at least one terminal device for the first information, and the at least one terminal device belongs to a same multicast group.

In an implementation, the feedback resource set further includes a second feedback resource, and the at least one terminal device includes a second terminal device.

The first feedback resource is orthogonal to the second feedback resource used for the second terminal device, or the first feedback resource partially or completely overlaps with the second feedback resource used for the second terminal device.

In an implementation, the resource configuration information includes a first feedback identifier and first resource configuration information used to configure the first feedback resource. The first feedback resource is used by at least one terminal device whose feedback identifier is the first feedback identifier.

It should be noted that for specific content such as an information execution process of the units of the communications apparatus 700, refer to descriptions in the foregoing method embodiments of this application. Details are not described herein again.

Figure 8:
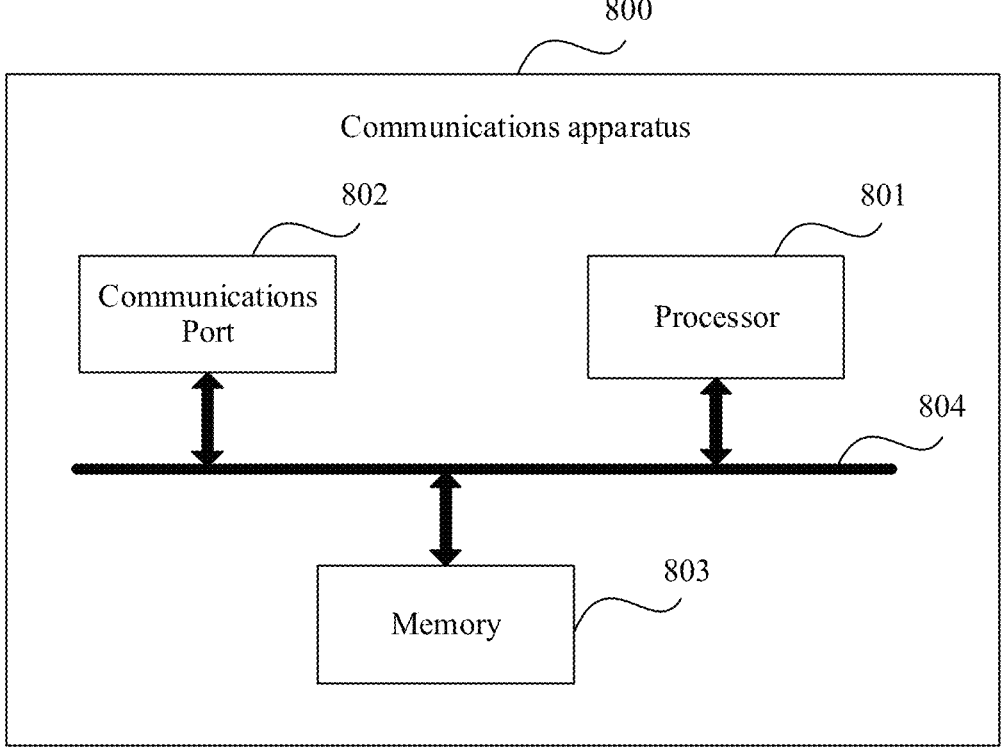
FIG. 8 is still yet another schematic diagram of a communications apparatus according to an embodiment of this application.

FIG. 8 is a schematic diagram of a possible logical structure of a communications apparatus 800. The communications apparatus is a communications apparatus in the foregoing embodiments according to an embodiment of this application. The communications apparatus may be the terminal device or a component in the terminal device in the foregoing embodiments. The communications apparatus 800 may include but is not limited to at least one processor 801 and a communications port 802. Further optionally, the apparatus may further include at least one of a memory 803 and a bus 804. In this embodiment of this application, the at least one processor 801 is configured to control an action of the communications apparatus 800.

In addition, the processor 801 may be a central processing unit, a general-purpose processor, a digital signal processor, an application-specific integrated circuit, a field programmable gate array, another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. A person skilled in the art may clearly understand that, for the purpose of convenient and brief description, for a specific working process of the foregoing system, apparatus, and unit, refer to a corresponding process in the foregoing method embodiments, and details are not described herein again.

It should be noted that the communications apparatus shown in FIG. 8 may be configured to implement the steps implemented by the terminal device in the method embodiment corresponding to FIG. 2 or FIG. 3, and implement technical effects corresponding to the terminal device. For a specific implementation of the communications apparatus shown in FIG. 8, refer to the descriptions in the method embodiments corresponding to FIG. 2 or FIG. 3. Details are not described herein again.

Figure 9:
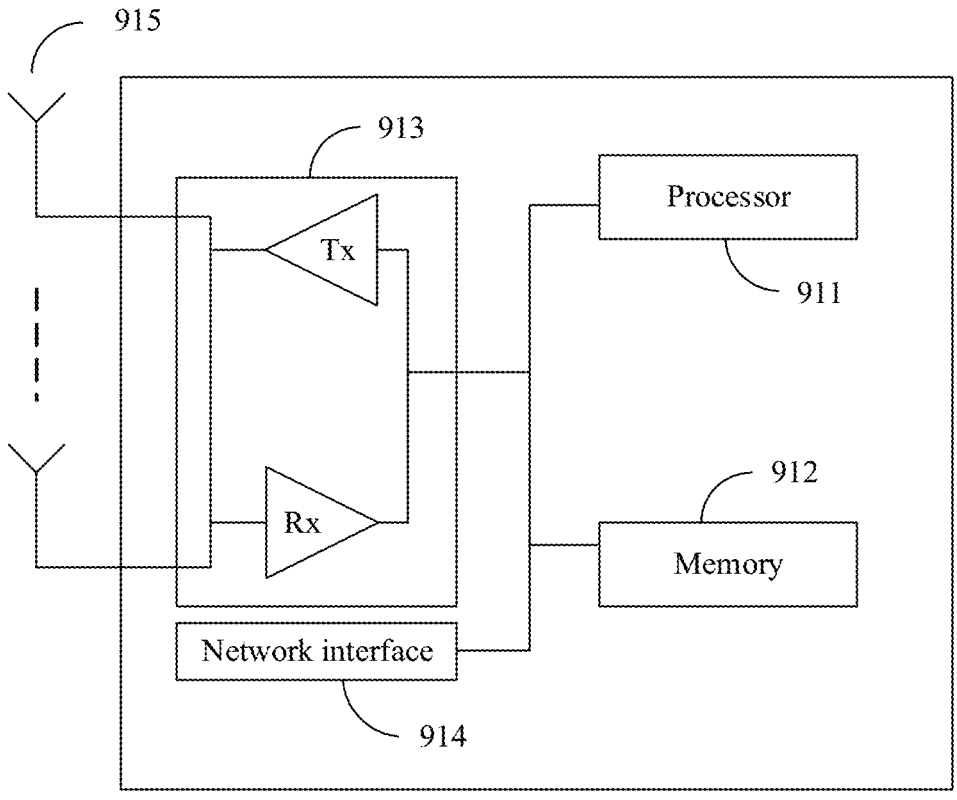
FIG. 9 is a further schematic diagram of a communications apparatus according to an embodiment of this application.

FIG. 9 is a schematic diagram of a structure of a communications apparatus in the foregoing embodiments according to an embodiment of this application. The communications apparatus may be the network device or a component in the network device in the foregoing embodiments. For a structure of the communications apparatus, refer to the structure shown in FIG. 9.

The communications apparatus includes at least one processor 911 and at least one network interface 914. Further optionally, the communications apparatus further includes at least one memory 912, at least one transceiver 913, and one or more antennas 915. The processor 911, the memory 912, the transceiver 913, and the network interface 914 are connected, for example, by using a bus. In this embodiment of this application, the connection may include various interfaces, transmission lines, buses, or the like. This is not limited in this embodiment. The antennas 915 are connected to the transceiver 913. The network interface 914 is configured to enable the communications apparatus to communicate with another communications device by using a communications link. For example, the network interface 914 may include a network interface between the communications apparatus and a core network device, for example, an S1 interface. The network interface may include a network interface between the communications apparatus and another communications apparatus (for example, another network device or a core network device), for example, an X2 or Xn interface.

The processor 911 is mainly configured to process a communications protocol and communications data, control the entire communications apparatus, execute a software program, and process data of the software program. For example, the processor 911 is configured to support the communications apparatus in performing actions described in the foregoing method embodiments. The communications apparatus may include a baseband processor and a central processing unit. The baseband processor is mainly configured to process a communications protocol and communications data. The central processing unit is mainly configured to control the entire terminal device, execute software program, and process data of the software program. The processor 911 in FIG. 9 may integrate functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. A function of processing the communications protocol and the communications data may be built in the processor, or may be stored in the memory in a form of a software program. The processor executes the software program to implement a baseband processing function.

The memory is mainly configured to store the software program and data. The memory 912 may exist independently, and is connected to the processor 911. Optionally, the memory 912 may be integrated with the processor 911, for example, integrated into a chip. The memory 912 can store program code for executing the technical solutions in embodiments of this application, and the processor 911 controls the execution. Various types of executed computer program code may also be considered as drivers of the processor 911.

FIG. 9 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or an independent storage element. This is not limited in embodiments of this application.

The transceiver 913 may be configured to support receiving or sending of a radio frequency signal between the communications apparatus and the terminal, and the transceiver 913 may be connected to the antennas 915. The transceiver 913 includes a transmitter Tx and a receiver Rx. Further, the one or more antennas 915 may receive the radio frequency signal. The receiver Rx of the transceiver 913 is configured to receive the radio frequency signal from the antennas, convert the radio frequency signal into a digital baseband signal or a digital intermediate frequency signal, and provide the digital baseband signal or the digital intermediate frequency signal for the processor 911, so that the processor 911 further processes the digital baseband signal or the digital intermediate frequency signal, for example, performs demodulation processing and decoding processing. In addition, the transmitter Tx of the transceiver 913 is further configured to receive a modulated digital baseband signal or a modulated digital intermediate frequency signal from the processor 911, convert the modulated digital baseband signal or the digital intermediate frequency signal into a radio frequency signal, and send the radio frequency signal through the one or more antennas 915. Further, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The transceiver may also be referred to as a transceiver unit, a transceiver machine, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. That is, the transceiver unit includes the receiving unit and the sending unit. The receiving unit may also be referred to as a receiver, an input port, a receiver circuit, or the like. The sending unit may be referred to as a transmitter, a transmitter machine, a transmitter circuit, or the like.

It should be noted that the communications apparatus shown in FIG. 9 may be configured to implement the steps implemented by the network device in the method embodiment corresponding to FIG. 2 or FIG. 3, and implement technical effects corresponding to the network device. For a specific implementation of the communications apparatus shown in FIG. 9, refer to the descriptions in the method embodiments corresponding to FIG. 2 or FIG. 3. Details are not described herein again.

An embodiment of this application further provides a computer-readable storage medium storing one or more computer executable instructions. When the computer executable instructions are executed by a processor, the processor performs the method according to the possible implementations of the terminal device in the foregoing embodiments, that is, the terminal device in the method embodiment corresponding to FIG. 2 or FIG. 3.

An embodiment of this application further provides a computer-readable storage medium storing one or more computer executable instructions. When the computer executable instructions are executed by a processor, the processor performs the method according to the possible implementations of the network device in the foregoing embodiments, that is, the network device in the method embodiment corresponding to FIG. 2 or FIG. 3.

An embodiment of this application further provides a computer program product (or a computer program) storing one or more computers. When the computer program product is executed by a processor, the processor performs the method in the foregoing possible implementations of the terminal device, that is, the terminal device in the method embodiment corresponding to FIG. 2 or FIG. 3.

An embodiment of this application further provides a computer program product storing one or more computers. When the computer program product is executed by the processor, the processor performs the method in the foregoing possible implementations of the network device, that is, the network device in the method embodiment corresponding to FIG. 2 or FIG. 3.

An embodiment of this application further provides a chip system. The chip system includes at least one processor, configured to support a terminal device in implementing functions in the foregoing possible implementations of the terminal device. Optionally, the chip system further includes an interface circuit, and the interface circuit provides program instructions and/or data for the at least one processor. In a possible design, the chip system may further include a memory. The memory is configured to store program instructions and data that are necessary for the terminal device. The chip system may include a chip, or may include a chip and another discrete component. The terminal device may be the terminal device in the method embodiment corresponding to FIG. 2 or FIG. 3.

An embodiment of this application further provides a chip system. The chip system includes at least one processor, configured to support a network device in implementing functions in the foregoing possible implementations of the network device. Optionally, the chip system further includes an interface circuit, and the interface circuit provides program instructions and/or data for the at least one processor. In a possible design, the chip system may further include a memory. The memory is configured to store program instructions and data that are necessary for the network device. The chip system may include a chip, or may include a chip and another discrete component. The network device may be the network device in the method embodiment corresponding to FIG. 2 or FIG. 3.

An embodiment of this application further provides a communications system. The network system architecture includes the terminal device and the network device in any one of the foregoing embodiments, that is, the terminal device and the network device in the method embodiment corresponding to FIG. 2 or FIG. 3.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit. When the integrated unit is implemented in the form of the software functional unit and sold or used as an independent product, the integrated unit may be stored in a computer-readable storage medium. Based on such an understanding, the technical solutions of this disclosure may be implemented in the form of a software product. The computer software product is stored in a storage medium and includes several instructions for instructing a computer device (which may be a personal computer, a server, or a network device) to perform all or some of the steps of the methods described in embodiments of this application. The storage medium includes any medium that can store program code, such as a Universal Serial Bus (USB) flash drive, a removable hard disk, a read-only memory (ROM), a random-access memory (RAM), a magnetic disk, or an optical disc.

What is claimed is:

1. A wireless communications method comprising:
receiving first feature information and first configuration information from a network device, wherein the first feature information corresponds to a first location within a vehicle, and wherein the first configuration information is for configuring at least one wireless communications parameter; and
configuring, in response to a second location of a terminal device within the vehicle matching the first location, the at least one wireless communications parameter of the terminal device.

2. The wireless communications method of claim 1, wherein the first feature information is preconfigured or predefined.

3. The wireless communications method of claim 1, wherein the first feature information identifies third location information in a cockpit.

4. The wireless communications method of claim 1, wherein the first feature information comprises first type information, wherein the first type information indicates at least one device type, and wherein configuring the at least one wireless communications parameter comprises configuring, in response to second type information of the terminal device matching the first type information, the at least one wireless communications parameter of the terminal device.

5. The wireless communications method of claim 1, wherein the first feature information comprises first priority information, wherein the first priority information indicates at least one device priority, and wherein configuring the at least one wireless communications parameter comprises configuring, in response to second priority information of the terminal device matching the first priority information, the at least one wireless communications parameter of the terminal device.

6. The wireless communications method of claim 1, wherein the at least one wireless communications parameter comprises transmit power.

7. A communications apparatus comprising:
a non-transitory storage medium configured to store instructions; and
one or more processors coupled to the non-transitory storage medium and configured to execute the instructions to cause the communications apparatus to:
receive first feature information and first configuration information from a network device, wherein the first feature information corresponds to a first location within a vehicle, and wherein the first configuration information is for configuring at least one wireless communications parameter; and
configure, in response to a second location of a terminal device within the vehicle matching the first location, the at least one wireless communications parameter of the terminal device.

8. The communications apparatus of claim 7, wherein the first feature information is preconfigured or predefined.

9. The communications apparatus of claim 7, wherein the first feature information identifies third location information in a cockpit.

10. The communications apparatus of claim 7, wherein the first feature information comprises first type information, wherein the first type information indicates at least one device type, and wherein the one or more processors are further configured to execute the instructions to configure the at least one wireless communication parameter by configuring, in response to second type information of the terminal device matching the first type information, the at least one wireless communications parameter of the terminal device.

11. The communications apparatus of claim 7, wherein the first feature information comprises first priority information, wherein the first priority information indicates at least one device priority, and wherein the one or more processors are further configured to execute the instructions to configure the at least one wireless communication parameter by configuring, in response to second priority information of the terminal device matching the first priority information, the at least one wireless communications parameter of the terminal device.

12. The communications apparatus of claim 7, wherein the at least one wireless communications parameter comprises transmit power.

13. A communications apparatus comprising:
a non-transitory storage medium configured to store instructions; and
one or more processors coupled to the non-transitory storage medium and configured to execute the instructions to cause the communications apparatus to:
obtain first feature information and first configuration information, wherein the first feature information corresponds to a first location within a vehicle, and wherein the first configuration information is for configuring at least one wireless communications parameter; and
send the first feature information and the first configuration information to a terminal device to instruct the terminal device to configure the at least one wireless communication parameter of the terminal device when a second location of the terminal device matches the first location.

14. The communications apparatus of claim 13, wherein the first feature information identifies third location information in a cockpit.

15. The wireless communication method of claim 1, wherein the at least one wireless communication parameter of the terminal device comprises transmit power.

16. The wireless communication method of claim 1, wherein the at least one wireless communication parameter of the terminal device comprises a modulation and coding scheme.

17. The wireless communication method of claim 1, wherein the at least one wireless communication parameter of the terminal device comprises a bit rate.

18. The wireless communication method of claim 1, wherein the at least one wireless communication parameter of the terminal device comprises time-frequency resource configuration information.

19. The wireless communication method of claim 1, wherein the first location within the vehicle comprises a seat position, a door position, or a window position.

20. The wireless communication method of claim 1, wherein the network device comprises a cockpit domain controller or an intelligent terminal, and wherein the terminal device comprises an in-vehicle speaker, an in-vehicle microphone, or an in-vehicle screen.

\* \* \* \* \*